United States Patent
Wolgé

(10) Patent No.: US 9,727,597 B2
(45) Date of Patent: Aug. 8, 2017

(54) DIMENSION LIMITS IN INFORMATION MINING AND ANALYSIS

(71) Applicant: QlikTech International AB, Lund (SE)

(72) Inventor: Håkan Wolgé, Malmö (SE)

(73) Assignee: QLIKTECH INTERNATIONAL AB, Lund (SE)

( * ) Notice: Subject to any disclaimer, the term of this patent is extended or adjusted under 35 U.S.C. 154(b) by 354 days.

(21) Appl. No.: 14/282,744

(22) Filed: May 20, 2014

(65) Prior Publication Data

US 2016/0026664 A1 Jan. 28, 2016

Related U.S. Application Data

(63) Continuation of application No. 13/528,575, filed on Jun. 20, 2012, now Pat. No. 8,745,099.

(60) Provisional application No. 61/558,799, filed on Nov. 11, 2011.

(51) Int. Cl.
G06F 17/30 (2006.01)
G06F 3/048 (2013.01)
G06F 3/0484 (2013.01)

(52) U.S. Cl.
CPC ........ *G06F 17/30333* (2013.01); *G06F 3/048* (2013.01); *G06F 3/04842* (2013.01); *G06F 17/30312* (2013.01); *G06F 17/30339* (2013.01); *G06F 17/30572* (2013.01); *G06F 17/30592* (2013.01)

(58) Field of Classification Search
USPC ................ 707/607, 609, 687, 705, 790, 821
See application file for complete search history.

(56) References Cited

U.S. PATENT DOCUMENTS

| | | | |
|---|---|---|---|
| 5,918,232 | A | 6/1999 | Pouschine et al. |
| 6,161,105 | A | 12/2000 | Keighan et al. |
| 7,058,621 | B1 | 6/2006 | Wolgé |
| 7,213,199 | B2 | 5/2007 | Humenansky et al. |
| 7,233,951 | B1 | 6/2007 | Gainer et al. |
| 7,392,484 | B1 | 6/2008 | Garfinkel et al. |
| 8,255,791 | B2 | 8/2012 | Koren |
| 8,745,099 | B2 | 6/2014 | Wolgé et al. |

(Continued)

FOREIGN PATENT DOCUMENTS

| | | | |
|---|---|---|---|
| JP | 2002-539563 A | 11/2002 | |
| JP | 2005-352704 A | 12/2005 | |

(Continued)

OTHER PUBLICATIONS

Heer J, et al. "Voyagers and Voyeurs: Supporting Asynchronous Collaborative Information Visualization Introduction", CHI 2007 Proceedings, Apr. 28, 2007, pp. 1029-1038, XP055090943, San Jose, California, USA (http://hint.fm/papers/2007-sense.us-CHI.pdf).

(Continued)

*Primary Examiner* — Sana Al Hashemi
(74) *Attorney, Agent, or Firm* — Ballard Spahr LLP

(57) ABSTRACT

Provided are methods, systems, and computer readable media for user interaction with database methods and systems. In an aspect, a user interface can be generated to permit dynamic display generation to view data. The system can comprise a visualization component to dynamically generate one or more visual representations of the data to present in the state space.

20 Claims, 21 Drawing Sheets

(56) References Cited

U.S. PATENT DOCUMENTS

| | | | |
|---|---|---|---|
| 2002/0035533 A1 | 3/2002 | Mache et al. | |
| 2008/0115049 A1 | 5/2008 | Tolle et al. | |
| 2008/0301155 A1 | 12/2008 | Borgsmidt | |
| 2009/0144313 A1 | 6/2009 | Hodge et al. | |
| 2010/0017436 A1 | 1/2010 | Wolgé | |
| 2010/0063958 A1* | 3/2010 | Bakalash | G06F 17/30457 707/600 |
| 2011/0029955 A1 | 2/2011 | McKaskle et al. | |
| 2011/0271197 A1 | 11/2011 | Jones et al. | |
| 2013/0159882 A1 | 6/2013 | Wolgé | |
| 2013/0159901 A1 | 6/2013 | Wolgé | |

FOREIGN PATENT DOCUMENTS

| | | | |
|---|---|---|---|
| JP | 2008-059433 A | 3/2008 | |
| JP | 2008-250637 A | 10/2008 | |
| JP | 2014-540999 | 7/2012 | |
| JP | 2014-541000 | 7/2012 | |
| JP | 2014-541001 | 7/2012 | |
| JP | 2014-533402 A | 12/2014 | |
| JP | 2015-501967 A | 1/2015 | |
| JP | 2015-504548 A | 2/2015 | |
| WO | PCT/2012SE/070139 | 7/2012 | |
| WO | PCT/2012SE/070140 | 7/2012 | |
| WO | PCT/SE2012/070141 | 7/2012 | |
| WO | WO-2013-070139 A1 | 5/2013 | |
| WO | WO-2013/070140 A1 | 5/2013 | |
| WO | WO-2013/070141 A1 | 5/2013 | |

OTHER PUBLICATIONS

Cawley, Christian, Using Google Spreadsheets for Tables and Graphs, Nov. 17, 2010, Device Magazine, pp. 1-3.
Dalgleish, Debra, Different Drop Down Lists in Same Excel Cell, Aug. 9, 2010, Contextures Blog, pp. 1-7.
Dodge, Mark, Microsoft Excel 2010 Inside Out, Aug. 26, 2010, Microsoft Press ("Copying, Cutting, and Pasting" under "8. Worksheet Editing Techniques") and ("Understanding Logical Functions" under "14. Everyday Functions").
Gregory, Excel Tables—Styles, Conditional Formatting and Data Validation, Apr. 7, 2011, Excel Semi-Pro, pp. 1-9.
Jalbert, Peter, Real Time Collaboration with Google Docs and Spreadsheets, Jan. 23, 2008, GoogleTutor, pp. 1-5.
Kraynak, Joe Absolute Beginner's Guide to Microsoft Office Excel 2003, Sep. 11, 2003, Que, pp. 48, 65-70, 101-103, 107, 138-140, and 259-260.
Kurz, Andreas, Data Warehousing—Enabling Technology, 1999, pp. 328-329, 331-333, and 355-356.
International Search Report and Written Opinion mailed on Dec. 11, 2013 by the International Searching Authority for International Patent Application No. PCT/SE2012/050852, which was filed on Jul. 27, 2012 and published as WO 2013/070139 on May 16, 2013 (Inventor—Wolgé; Applicant—Qliktech International AB) (13 pages).
International Preliminary Report on Patentability issued on May 13, 2014 by the International Searching Authority for International Patent Application No. PCT/SE2012/050852, which was filed on Jul. 27, 2012 and published as WO 2013/070139 on May 16, 2013 (Inventor—Wolgé; Applicant—Qliktech International AB) (8 pages).
International Search Report and Written Opinion mailed on May 6, 2013 by the International Searching Authority for International Patent Application No. PCT/SE2012/050853, which was filed on Jul. 27, 2012 and published as WO 2013/070140 on May 16, 2013 (Inventor—Wolgé; Applicant—Qliktech International AB) (12 pages).
International Preliminary Report on Patentability issued on May 13, 2014 by the International Searching Authority for International Patent Application No. PCT/SE2012/050853, which was filed on Jul. 27, 2012 and published as WO 2013/070140 on May 16, 2013 (Inventor—Wolgé; Applicant—Qliktech International AB) (8 pages).
International Search Report and Written Opinion mailed on May 14, 2013 by the International Searching Authority for International Patent Application No. PCT/SE2012/050854, which was filed on Jul. 27, 2012 and published as WO 2013/070141 on May 16, 2013 (Inventor—Wolgé; Applicant—Qliktech International AB) (9 pages).
International Preliminary Report on Patentability issued on May 13, 2014 by the International Searching Authority for International Patent Application No. PCT/SE2012/050854, which was filed on Jul. 27, 2012 and published as WO 2013/070141 on May 16, 2013 (Inventor—Wolgé; Applicant—Qliktech International AB) (6 pages).
Non-Final Office action issued Jun. 30, 2015 by the Japanese Patent Office for Japanese Patent Application No. 2014-540999, which was filed Jul. 27, 2012 and published as 2015-504548 on Jun. 19, 2014 (Inventor—Wolgé; Applicant—QuikTech International AB) (4 pages).
Anonymous, "The Cells of a Spreadsheet", Mar. 26, 2010, FunctionX, (18 pages).
Anonymous, "OLAP Cube in Excel and Pivot Table from External Data", Nov. 5, 2009, Databison, (8 pages).
Anonymous, Sorting Months in Webi, Mar. 17, 2011, BOBJ Tricks, (9 pages).
Proportional Symbol Maps with ArcGIS, Jun. 18, 2007, UCSB Department of Geography, (39 pages).

* cited by examiner

Table 6

| Product | |
|---|---|
| Soap | 0 |
| Soft soap | 1 |
| Toothpaste | 2 |
| Shampoo | 3 |

Table 7

| Price | |
|---|---|
| 7.5 | 0 |
| 9.35 | 1 |
| 6.5 | 2 |

Table 9

| Client | |
|---|---|
| Nisse | 0 |
| Gullan | 1 |
| Kalle | 2 |
| Pekka | 3 |
| Jens | 4 |

Table 8

| Date | |
|---|---|
| 1999-01-02 | 0 |
| 1999-01-07 | 1 |
| 1999-01-08 | 2 |
| 1999-01-11 | 3 |
| 1999-01-12 | 4 |
| 1999-01-15 | 5 |

Table 11

| Year | |
|---|---|
| 1999 | 0 |

Table 10

| Number | |
|---|---|
| 3 | 0 |
| 5 | 1 |
| 8 | 2 |
| 2 | 3 |
| 10 | 4 |

Table 12

| Country | |
|---|---|
| Sweden | 0 |
| Denmark | 1 |
| Finland | 2 |

Fig. 3

Table 13
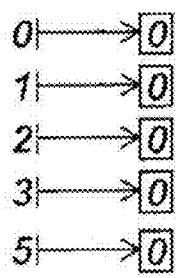
Table 14
Product → Price
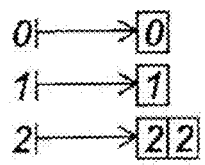
Table 15
| | Client | Year | Price | Number |
|---|---|---|---|---|
| | | | | 0 |
| | | 0 | | 0 |
| R1 | 0 | 0 | 2 | 0 |
| R2 | 0 | 0 | 2 | 0 |
| R3 | 1 | 0 | 0 | 1 |
| R4 | 2 | 0 | 0 | 2 |
| R5 | 2 | 0 | -2 | 3 |
| R6 | 3 | -2 | 0 | 4 |
| R7 | 0 | 0 | 0 | 3 |
Table 16
Aggregation field
| Client | Year | Σ Number*Price |
|---|---|---|
| 0 | 0 | Sum = Sum (0) + 3 x 6.5 -> 20.5 |
| 0 | 0 | Sum = Sum (20.5) + 3 x 6.5 -> 41 |
| 1 | 0 | Sum = Sum (0) + 5 x 7.5 -> 37.5 |
| 2 | 0 | Sum = Sum (0) + 8 x 7.5 -> 60 |
| 2 | 0 | Sum = Sum (60) + 2 x (NULL) -> 60 |
| 3 | -2 | Sum = Sum (0) + 10 x 7.5 -> 75 |
| 0 | 0 | Sum = Sum (41) + 2 x (NULL) -> 41 |
| -1 | 0 | Sum = Sum (0) + 20.5 + 20.5 + 37.5 + 60 + 0 + 0 -> 138.5 |
| -1 | -2 | Sum = Sum (0) + 75 -> 75 |
| 0 | -1 | Sum = Sum (0) + 20.5 + 20.5 + 0 -> 41 |
| 1 | -1 | Sum = Sum (0) + 37.5 -> 37.5 |
| 2 | -1 | Sum = Sum (0) + 60 + 0 -> 60 |
| 3 | -1 | Sum = Sum (0) + 75 -> 75 |
| -1 | -1 | Sum = Sum (0) + 20.5 + 20.5 + 37.5 + 60 + 0 + 75 + 0 -> 213.5 |
Fig. 4

Table 17

| Client | Year | Sum (Number x Price) |
|---|---|---|
| Nisse | 1999 | 41 |
| Gullan | 1999 | 37.5 |
| Kalle | 1999 | 60 |
| Pekka | <NULL> | 75 |
| <ALL> | 1999 | 138.5 |
| <ALL> | <NULL> | 75 |
| Nisse | <ALL> | 41 |
| Gullan | <ALL> | 37.5 |
| Kalle | <ALL> | 60 |
| Pekka | <ALL> | 75 |
| <ALL> | <ALL> | 213.5 |

Table 18

Sum (Price*Number) Per Client, Year

| | 1999 | <NULL> | <ALL> |
|---|---|---|---|
| Nisse | 41 | | 41 |
| Gullan | 37.5 | | 37.5 |
| Kalle | 60 | | 60 |
| Pekka | | 75 | 75 |
| <ALL> | 138.5 | 75 | 75 |

Table 20

| Date | Product | Number | Client |
|---|---|---|---|
| 1998-12-20 | B | 5 | Nisse |
| 1999-02-05 | A | 7 | Kalle |
| 1999-02-06 | B | 9 | Kalle |

Table 21

| Product | Price group | Product group |
|---|---|---|
| A | 4 | Z |
| B | 3 | X |

Table 22

| Price group | Price |
|---|---|
| 3 | 5.5 |
| 4 | 3.5 |

Table 23

| Product group | Environment index | Legal status |
|---|---|---|
| X | I | YES |
| Y | IX | NO |
| Z | II | YES |

Fig. 5

Table 24

Product group->Environment index
X ——> I
Y ——> IX
Z ——> II

Table 25

Price group ->Price
3 ——> 5.5
4 ——> 3.5

Table 26

Product->Price, Environment index
A ——> 3.5,II
B ——> 5.5,I

Table 27

| Client | Environment index | Number | Price |
|---|---|---|---|
| Nisse | I | 5 | 5.5 |
| Kalle | II | 7 | 3.5 |
| Kalle | I | 9 | 5.5 |

Table 28

| Client | Environment index | Σ–Number x Price | Σ–Environment index |
|---|---|---|---|
| Nisse | I | Σx: 27.5, N: 1 | First: I, Last: I |
| Kalle | II | Σx: 24.5, N: 1 | First: II, Last: II |
| Kalle | I | Σx: 49.5, N: 1 | First: I, Last: I |
| <ALL> | I | Σx: 77, N: 2 | First: I, Last: I |
| <ALL> | II | Σx: 24.5, N: 1 | First: II, Last: II |
| <ALL> | <ALL> | Σx: 101.5, N: 3 | First: I, Last: II |

Table 29

| Client | Environment index | IF(Only(Environment index)='I', Sum(Number*Price)*2,Sum(Number*Price)) | Avg(Number*Price) |
|---|---|---|---|
| Nisse | I | 55.0 | 27.5 |
| Kalle | II | 24.5 | 24.5 |
| Kalle | I | 99.0 | 49.5 |
| <ALL> | I | 154.0 | 38.5 |
| <ALL> | II | 24.5 | 24.5 |
| <ALL> | <ALL> | <NULL> | 33.8 |

*Fig. 6*

FIG. 11a
FIG. 11b
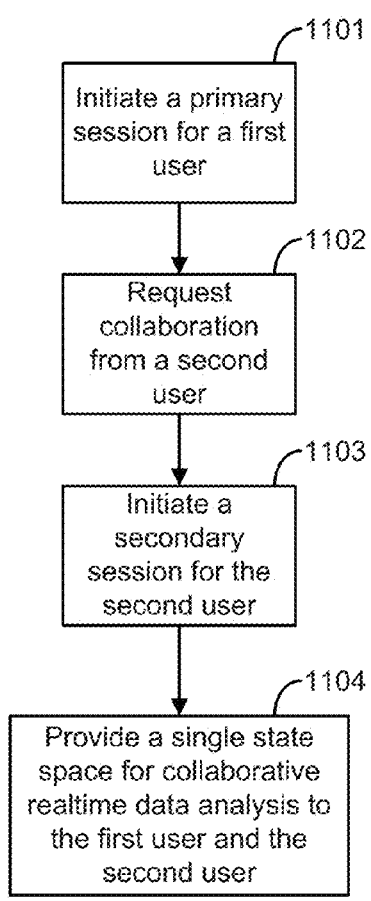
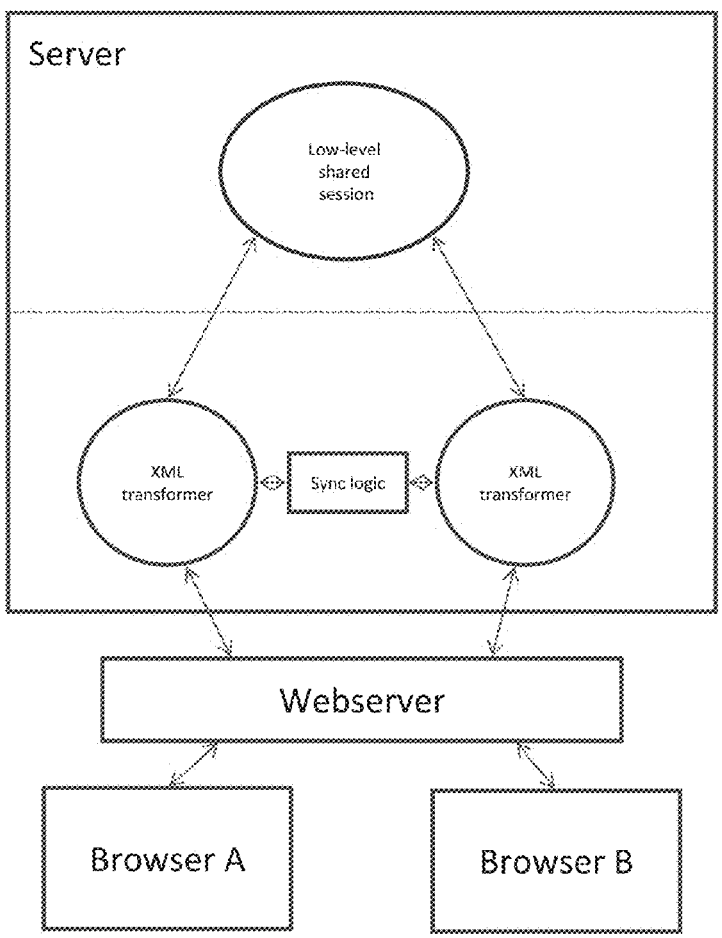

FIG. 17a

| Customer |
|---|
| A |
| B |
| C |
| D |
| E |
| F |

| Product |
|---|
| X |
| Y |

Data set

| Product | Customer | Sales |
|---|---|---|
| X | A | 35 |
| X | B | 39 |
| X | C | 33 |
| X | D | 4 |
| X | E | 7 |
| X | F | 17 |
| Y | A | 30 |
| Y | B | 15 |
| Y | C | 31 |
| Y | E | 16 |
| Y | F | 15 |

FIG. 17b

Full table

| Customer | Sum(Sales) |
|---|---|
| A | 65 |
| B | 54 |
| C | 64 |
| D | 4 |
| E | 23 |
| F | 32 |

FIG. 17c

First 3 (2 + others)

| Customer | Sum(Sales) |
|---|---|
| A | 65 |
| B | 54 |
| Others | 123 |

FIG. 17d

Largest 3 (2 + others)

| Customer | Sum(Sales) |
|---|---|
| A | 65 |
| C | 64 |
| Others | 113 |

FIG. 17e

Sum(Sales) >= 50

| Customer | Sum(Sales) |
|---|---|
| A | 65 |
| B | 54 |
| C | 64 |
| Others | 59 |

FIG. 17f

Top 80% of total sales

| Customer | Sum(Sales) |
|---|---|
| A | 65 |
| C | 64 |
| B | 54 |
| F | 32 |
| Others | 27 |

FIG. 18a

| Full table | | |
|---|---|---|
| Product | Customer | Sum(Sales) |
| X | A | 35 |
| X | B | 39 |
| X | C | 33 |
| X | D | 4 |
| X | E | 7 |
| X | F | 17 |
| Y | A | 30 |
| Y | B | 15 |
| Y | C | 31 |
| Y | E | 16 |
| Y | F | 15 |

FIG. 18b

| Largest 3 (2 + others) | | |
|---|---|---|
| Product | Customer | Sum(Sales) |
| X | A | 35 |
| X | B | 39 |
| X | Others | 61 |
| Y | A | 30 |
| Y | C | 31 |
| Y | Others | 46 |

FIG. 18c

| Largest 3 (2 + others) - Global grouping | | |
|---|---|---|
| Product | Customer | Sum(Sales) |
| X | A | 35 |
| X | C | 33 |
| X | Others | 67 |
| Y | A | 30 |
| Y | C | 31 |
| Y | Others | 46 |

DIMENSION LIMITS IN INFORMATION MINING AND ANALYSIS

CROSS REFERENCE TO RELATED PATENT APPLICATIONS

This application is a continuation of U.S. application Ser. No. 13/528,575, filed on Jun. 20, 2012, which claims priority to U.S. App. No. 61/558,799, filed Nov. 11, 2011, herein incorporated by reference in their entireties. Reference is also made to U.S. application Ser. No. 13/528,534, filed Jun. 20, 2012, entitled "Collaborative Data Mining and Analysis," and U.S. application Ser. No. 13/528,536, filed Jun. 20, 2012, entitled "Alternate States In Associative Information Mining and Analysis," both of which are herein incorporated by reference in their entireties.

SUMMARY

In an aspect, provided are methods and systems for user interaction with database methods and systems. In an aspect, a user interface can be generated to facilitate dynamic display generation to view data. The system can comprise a visualization component to dynamically generate one or more visual representations of the data to present in the state space.

The disclosure relates, in one aspect, to a method for data analysis. The method can comprise processing a dataset resulting in a first multidimensional cube data structure, the dataset having a table structure comprising one or more tables. In addition, the method can comprise generating a second multidimensional cube data structure by applying one or more dimension limits to the first multidimensional cube data structure.

In another aspect, the disclosure relates to a computing device, which can comprise a memory having computer-executable instructions; and a processor functionally coupled to the memory and configured, by the computer-executable instructions, to process a dataset resulting in a first multidimensional cube data structure the dataset having a table structure comprising one or more tables; and to apply one or more dimension limits to the first multidimensional cube data structure resulting in a second multidimensional cube data structure.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 3 illustrates exemplary Tables 6-12;
FIG. 4 illustrates exemplary Tables 13-16;
FIG. 5 illustrates exemplary Tables 17, 18, and 20-23;
FIG. 6 illustrates exemplary Tables 24-29;
FIG. 10$b$ illustrates another exemplary user interface;
FIG. 11$a$ is a block flow chart of an exemplary method;
FIG. 11$b$ is an exemplary operating environment;
FIG. 12$b$ illustrates another exemplary user interface;
FIG. 13$b$ is another block flow chart of an exemplary method;
FIG. 13$c$ is another block flow chart of an exemplary method;
FIGS. 17$a$-$f$ illustrate exemplary Tables;
FIGS. 18$a$-$c$ illustrate additional exemplary Tables.

DETAILED DESCRIPTION

Before the present methods and systems are disclosed and described, it is to be understood that the methods and systems are not limited to specific methods, specific components, or to particular configurations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps, or actions, that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description. U.S. Pat. No. 7,058,621 and U.S. patent application Ser. No. 12/504,695 are herein incorporated by reference in their entireties.

Figure 1:
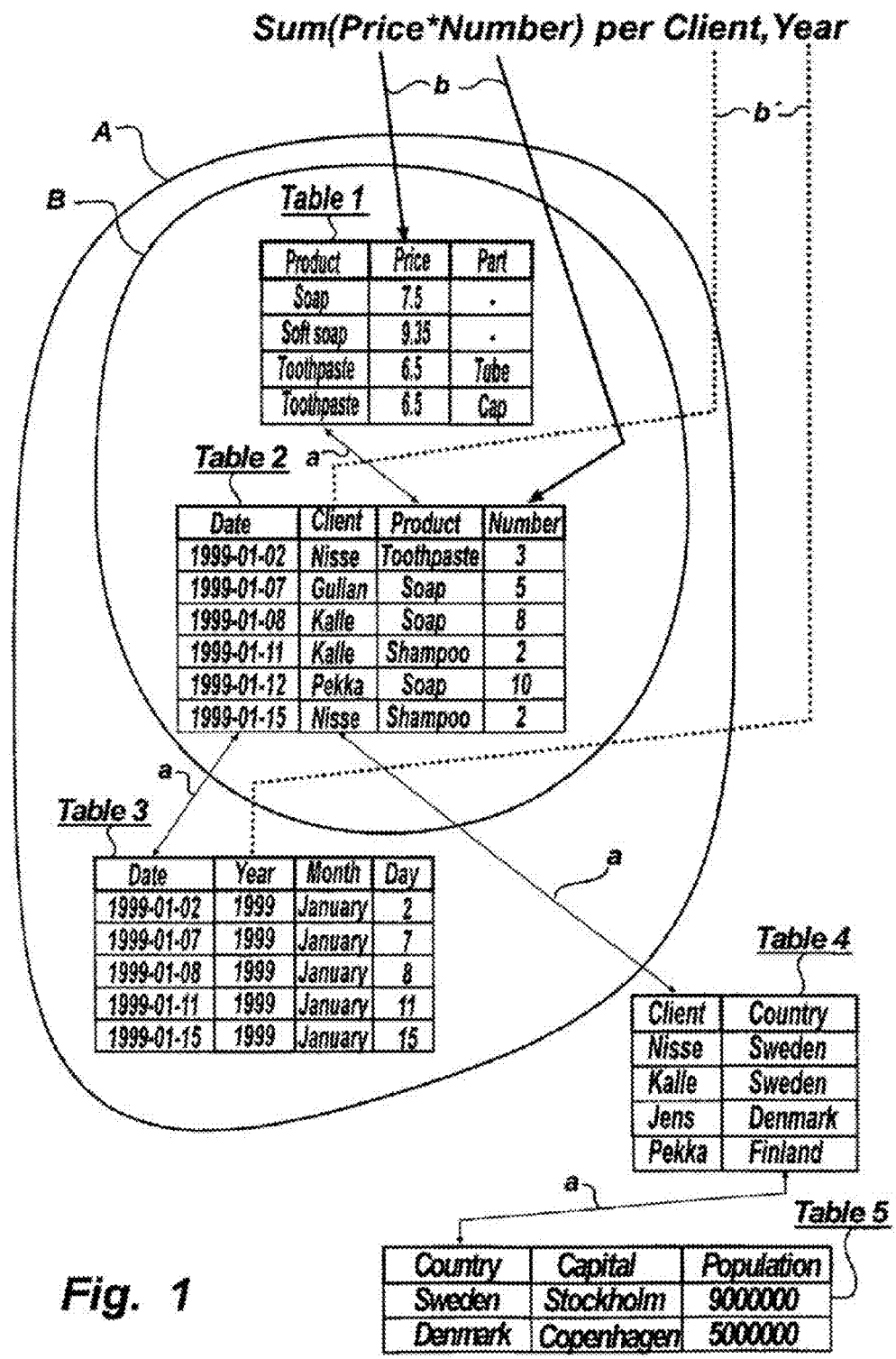
FIG. 1 illustrates exemplary Tables 1-5.
Figure 2:
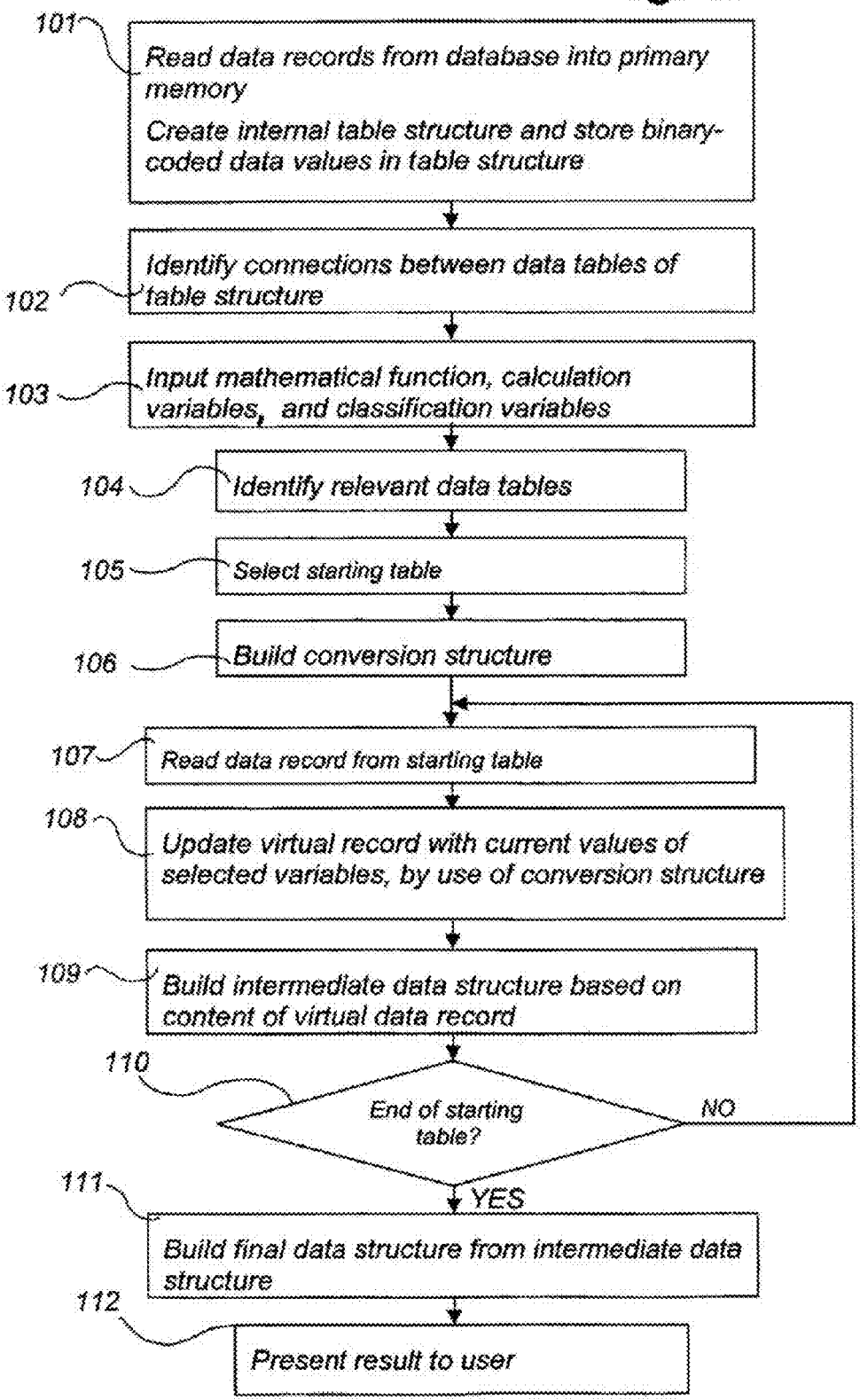
FIG. 2 illustrates a block flow chart of an exemplary method for extracting information from a database.

The methods and systems will now be described by way of examples, reference being made to FIGS. 1-6 of the drawings, FIG. 1 showing the content of a database after identification of relevant data tables according to the disclosed method(s), FIG. 2 showing a sequence of steps of an embodiment of the method(s) according to one or more aspects of the disclosure, and FIGS. 3-6 showing exemplary data tables.

A database, as shown in FIG. 1, comprises a number of data tables (Tables 1-5). Each data table contains data values of a number of data variables. For example, in Table 1 each data record contains data values of the data variables "Product", "Price" and "Part". If there is no specific value in a field of the data record, this field is considered to hold a NULL-value. Similarly, in Table 2 each data record contains values of the variables "Date", "Client", "Product" and "Number". Typically, the data values are stored in the form of ASCII-coded strings.

The method(s) according to one or more aspects of the present disclosure can be implemented by means of a computer program in response to execution by a processor, for example. In a first step (step 101), the program reads all data records in the database, for instance using a SELECT statement which selects all the tables of the database, e.g., Tables 1-5 in this case. Typically, the database is read into the primary memory of the computer.

To increase the evaluation speed, it is preferred that each unique value of each data variable in said database is assigned a different binary code and that the data records are stored in binary-coded form (step 101). This is typically done when the program first reads the data records from the database. For each input table, the following steps are carried out. First the column names, e.g., the variables, of the table are successively read. Every time a new data variable appears, a data structure is instantiated for it. Then, an internal table structure is instantiated to contain all the data records in binary form, whereupon the data records are successively read and binary-coded. For each data value, the data structure of the corresponding data variable is checked to establish if the value has previously been assigned a binary code. If so, that binary code is inserted in the proper place in the above-mentioned table structure. If not, the data value is added to the data structure and assigned a new binary code, preferably the next one in ascending order, before being inserted in the table structure. In other words, for each data variable, a unique binary code is assigned to each unique data value.

Tables 6-12 of FIG. 3 show the binary codes assigned to different data values of some data variables that are included in the database of FIG. 1.

After having read all data records in the database, the program analyses the database to identify all connections between the data tables (step 102). A connection between two data tables means that these data tables have one variable in common.

Different algorithms for performing such an analysis are known in the art. After the analysis all data tables are virtually connected. In FIG. 1, such virtual connections are illustrated by double-ended arrows (a). The virtually connected data tables should form at least one so-called snowflake structure, e.g., a branching data structure in which there is one and only one connecting path between any two data tables in the database. Thus, a snowflake structure does not contain any loops. If loops do occur among the virtually connected data tables, e.g. if two tables have more than one variable in common, a snowflake structure can in some cases still be formed by means of special algorithms known in the art for resolving such loops.

After this initial analysis, the user can start to explore the database. In doing so, the user defines a mathematical function, which could be a combination of mathematical expressions (step 103). Assume that the user wants to extract the total sales per year and client from the database in FIG. 1. The user defines a corresponding mathematical function "SUM(x*y)", and selects the calculation variables to be included in this function: "Price" and "Number". The user also selects the classification variables: "Client" and "Year".

The computer program then identifies all relevant data tables (step 104), e.g., all data tables containing any one of the selected calculation and classification variables, such data tables being denoted boundary tables, as well as all intermediate data tables in the connecting path(s) between these boundary tables in the snowflake structure, such data tables being denoted connecting tables. For the sake of clarity, the group of relevant data tables (Tables 1-3) is included in a first frame (A) in FIG. 1. Evidently, there are no connecting tables in this particular case.

In the present case, all occurrences of every value, e.g., frequency data, of the selected calculation variables must be included for evaluation of the mathematical function. In FIG. 1, the selected variables ("Price", "Number") requiring such frequency data are indicated by bold arrows (b), whereas remaining selected variables are indicated by dotted lines (b'). Now, a subset (B) can be defined that includes all boundary tables (Tables 1-2) containing such calculation variables and any connecting tables between such boundary tables in the snowflake structure. It should be noted that the frequency requirement of a particular variable is determined by the mathematical expression in which it is included. Determination of an average or a median calls for frequency information. In general, the same is true for determination of a sum, whereas determination of a maximum or a minimum does not require frequency data of the calculation variables. It can also be noted that classification variables in general do not require frequency data.

Then, a starting table is elected, preferably among the data tables within subset (B), most preferably the data table with the largest number of data records in this subset (step 105). In FIG. 1, Table 2 is elected as the starting table. Thus, the starting table contains selected variables ("Client", "Number"), and connecting variables ("Date", "Product"). These connecting variables link the starting table (Table 2) to the boundary tables (Tables 1 and 3).

Thereafter, a conversion structure is built (step 106), as shown in Tables 13 and 14 of FIG. 4. This conversion structure is used for translating each value of each connecting variable ("Date". "Product") in the starting table (Table 2) into a value of a corresponding selected variable ("Year", "Price") in the boundary tables (Table 3 and 1, respectively).

Table 13 is built by successively reading data records of Table 3 and creating a link between each unique value of the connecting variable ("Date") and a corresponding value of the selected variable ("Year"). It can be noted that there is no link from value 4 ("Date: 1999-01-12"), since this value is not included in the boundary table. Similarly, Table 14 is built by successively reading data records of Table 1 and creating a link between each unique value of the connecting variable ("Product") and a corresponding value of the selected variable ("Price"). In this case, value 2 ("Product: Toothpaste") is linked to two values of the selected variable ("Price: 6.5"), since this connection occurs twice in the boundary table. Thus, frequency data is included in the conversion structure. Also note that there is no link from value 3 ("Product: Shampoo").

When the conversion structure has been built, a virtual data record is created. Such a virtual data record, as shown in Table 15, accommodates all selected variables ("Client", "Year", "Price", "Number") in the database. In building the virtual data record (steps 107-108), a data record is first read from the starting table (Table 2). Then, the value of each selected variable ("Client", "Number") in the current data record of the starting table is incorporated in the virtual data record. Also, by using the conversion structure (Tables 13-14) each value of each connecting variable ("Date", "Product") in the current data record of the starting table is converted into a value of a corresponding selected variable ("Year", "Price"), this value also being incorporated in the virtual data record.

At this stage (step 109), the virtual data record is used to build an intermediate data structure (Table 16). Each data record of the intermediate data structure accommodates each selected classification variable (dimension) and an aggregation field for each mathematical expression implied by the mathematical function. The intermediate data structure (Table 16) is built based on the values of the selected variables in the virtual data record. Thus, each mathematical expression is evaluated based on one or more values of one or more relevant calculation variables in the virtual data record, and the result is aggregated in the appropriate aggregation field based on the combination of current values of the classification variables ("Client", "Year").

The above procedure is repeated for all data records of the starting table (step 110). Thus, an intermediate data structure is built by successively reading data records of the starting table, by incorporating the current values of the selected variables in a virtual data record, and by evaluating each mathematical expression based on the content of the virtual data record. If the current combination of values of classification variables in the virtual data record is new, a new data record is created in the intermediate data structure to hold the result of the evaluation. Otherwise, the appropriate data record is rapidly found, and the result of the evaluation is aggregated in the aggregation field. Thus, data records are added to the intermediate data structure as the starting table is traversed. Preferably, the intermediate data structure is a data table associated with an efficient index system, such as an AVL or a hash structure. In most cases, the aggregation field is implemented as a summation register, in which the result of the evaluated mathematical expression is accumulated. In some cases, e.g. when evaluating a median, the aggregation field is instead implemented to hold all individual results for a unique combination of values of the specified classification variables. It should be noted that only one virtual data record is needed in the procedure of building the intermediate data structure from the starting table. Thus, the content of the virtual data record is updated for each data record of the starting table. This will minimize the memory requirement in executing the computer program.

The procedure of building the intermediate data structure will be further described with reference to Tables 15-16. In creating the first virtual data record R1, as shown in Table 15, the values of the selected variables "Client" and "Number" are directly taken from the first data record of the starting table (Table 2). Then, the value "1999-01-02" of the connecting variable "Date" is transferred into the value "1999" of the selected variable "Year", by means of the conversion structure (Table 13). Similarly, the value "Toothpaste" of the connecting variable "Product" is transferred into the value "6.5" of the selected variable "Price" by means of the conversion structure (Table 14), thereby forming the virtual data record R1. Then, a data record is created in the intermediate data structure, as shown in Table 16. In this case, the intermediate data structure has tree columns, two of which holds selected classification variables ("Client", "Year"). The third column holds an aggregation field, in which the evaluated result of the mathematical expression ("x*y") operating on the selected calculation variables ("Number", "Price") is aggregated. In evaluating virtual data record R1, the current values (binary codes: 0,0) of the classification variables are first read and incorporated in this data record of the intermediate data structure. Then, the current values (binary codes: 2,0) of the calculation variables are read. The mathematical expression is evaluated for these values and added to the associated aggregation field.

Next, the virtual data record is updated based on the starting table. Since the conversion structure (Table 14) indicates a duplicate of the value "6.5" of the selected variable "Price" for the value "Toothpaste" of the connecting variable "Product", the updated virtual data record R2 is unchanged and identical to R1. Then, the virtual data record R2 is evaluated as described above. In this case, the intermediate data structure contains a data record corresponding to the current values (binary codes: 0,0) of the classification variables. Thus, the evaluated result of the mathematical expression is accumulated in the associated aggregation field.

Next, the virtual data record is updated based on the second data record of starting table. In evaluating this updated virtual data record R3, a new data record is created in the intermediate data structure, and so on.

It should be noted that NULL values are represented by a binary code of −2 in this example. In the illustrated example, it should also be noted that any virtual data records holding a NULL value (−2) of any one of the calculation variables can be directly eliminated, since NULL values can not be evaluated in the mathematical expression ("x*y"). It should also be noted that all NULL values (−2) of the classification variables are treated as any other valid value and are placed in the intermediate data structure.

After traversing the starting table, the intermediate data structure contains four data records, each including a unique combination of values (0,0; 1,0; 2,0; 3,−2) of the classification variables, and the corresponding accumulated result (41; 37.5; 60; 75) of the evaluated mathematical expression.

Preferably, the intermediate data structure is also processed to eliminate one or more classification variables (or dimension variables). Preferably, this is done during the process of building the intermediate data structure, as described above. Every time a virtual data record is evaluated, additional data records are created, or found if they already exist, in the intermediate data structure. Each of these additional data records is destined to hold an aggregation of the evaluated result of the mathematical expression for all values of one or more classification variables. Thus, when the starting table has been traversed, the intermediate data structure will contain both the aggregated results for all unique combinations of values of the classification variables, and the aggregated results after elimination of each relevant classification variable.

This procedure of eliminating dimensions in the intermediate data structure will be further described with reference to Tables 15 and 16. When virtual data record R1 is evaluated (Table 15) and the first data record (0,0) is created in the intermediate data structure, additional data records are created in this structure. Such additional data records are destined to hold the corresponding results when one or more dimensions are eliminated. In Table 16, a classification variable is assigned a binary code of −1 in the intermediate data structure to denote that all values of this variable are evaluated. In this case, three additional data records are created, each holding a new combination of values (−1,0; 0,−1; −1,−1) of the classification variables. The evaluated result is aggregated in the associated aggregation field of these additional data records. The first (−1,0) of these additional data records is destined to hold the aggregated result for all values of the classification variable "Client" when the classification variable "Year" has the value "1999". The second (0,−1) additional data record is destined to hold the aggregated result for all values of the classification variable "Year" when the classification variable "Client" is "Nisse". The third (−1,−1) additional data record is destined to hold the aggregated result for all values of both classification variables "Client" and "Year".

When virtual data record R2 is evaluated, the result is aggregated in the aggregation field associated with the current combination of values (binary codes: 0,0) of the classification variables, as well as in the aggregation fields associated with relevant additional data records (binary codes: −1,0; 0,−1; −1,−1). When virtual data record R3 is evaluated, the result is aggregated in the aggregation field associated with the current combination of values (binary codes: 1,0) of the classification variables. The result is also aggregated in the aggregation field of a newly created additional data record (binary codes: 1,−1) and in the aggregation fields associated with relevant existing data records (binary codes: −1,0; −1,−1) in the intermediate data structure.

After traversing the starting table, the intermediate data structure contains eleven data records, as shown in Table 16. Preferably, if the intermediate data structure accommodates more than two classification variables, the intermediate data structure will, for each eliminated classification variable, contain the evaluated results aggregated over all values of this classification variable for each unique combination of values of remaining classification variables.

When the intermediate data structure has been built, a final data structure, e.g., a multidimensional cube, as shown in non-binary notation in Table 17 of FIG. 5, is created by evaluating the mathematical function ("SUM (x*y)") based on the results of the mathematical expression ("x*y") contained in the intermediate data structure (step 111). In doing so, the results in the aggregation fields for each unique combination of values of the classification variables are combined. In the illustrated case, the creation of the final data structure is straightforward, due to the trivial nature of the present mathematical function. The content of the final data structure might then (step 112) be presented to the user in a two-dimensional table, as shown in Table 18 of FIG. 5. Alternatively, if the final data structure contains many dimensions, the data can be presented in a pivot table, in which the user interactively can move up and down in dimensions, as is well known in the art.

Below, a second example of the disclosed method(s) can be described with reference to Tables 20-29 of FIGS. 5-6. The description will only elaborate on certain aspects of this example, namely building a conversion structure including data from connecting tables, and building an intermediate data structure for a more complicated mathematical function. In this example, the user wants to extract sales data per client from a database, which contains the data tables shown in Tables 20-23 of FIG. 5. For ease of interpretation, the binary coding is omitted in this example.

The user has specified the following mathematical functions, for which the result should be partitioned per Client: a) "IF(Only(Environment index)='I') THEN Sum (Number*Price)*2, ELSE Sum(Number*Price))", and b) "Avg(Number*Price)"

The mathematical function (a) specifies that the sales figures should be doubled for products that belong to a product group having an environment index of 'I', while the actual sales figures should be used for other products. The mathematical function (b) has been included for reference.

In this case, the selected classification variables are "Environment index" and "Client", and the selected calculation variables are "Number" and "Price". Tables 20, 22 and 23 are identified as boundary tables, whereas Table 21 is identified as a connecting table. Table 20 is elected as starting table. Thus, the starting table contains selected variables ("Number", "Client"), and a connecting variable ("Product"). The connecting variable links the starting table (Table 20) to the boundary tables (Tables 22-23), via the connecting table (Table 21).

Next, the formation of the conversion structure will be described with reference to Tables 24-26 of FIG. 6. A first part (Table 24) of the conversion structure is built by successively reading data records of a first boundary table (Table 23) and creating a link between each unique value of the connecting variable ("Product group") and a corresponding value of the selected variable ("Environment index"). Similarly, a second part (Table 25) of the conversion structure is built by successively reading data records of a second boundary table (Table 22) and creating a link between each unique value of the connecting variable ("Price group") and a corresponding value of the selected variable ("Price"). Then, data records of the connecting table (Table 21) are read successively. Each value of the connecting variables ("Product group" and "Price group", respectively) in Tables 24 and 25 is substituted for a corresponding value of a connecting variable ("Product") in Table 21. The result is merged in one final conversion structure, as shown in Table 26.

Then, an intermediate data structure is built by successively reading data records of the starting table (Table 20), by using the conversion structure (Table 26) to incorporate the current values of the selected variables ("Environment index", "Client", "Number", "Price") in the virtual data record, and by evaluating each mathematical expression based on the current content of the virtual data record.

For reasons of clarity, Table 27 displays the corresponding content of the virtual data record for each data record of the starting table. As noted in connection with the first example, only one virtual data record is needed. The content of this virtual data record is updated, e.g., replaced, for each data record of the starting table.

Each data record of the intermediate data structure, as shown in Table 28, accommodates a value of each selected classification variable ("Client", "Environment index") and an aggregation field for each mathematical expression implied by the mathematical functions. In this case, the intermediate data structure contains two aggregation fields. One aggregation field contains the aggregated result of the mathematical expression ("x*y") operating on the selected calculation variables ("Number", "Price"), as well as a counter of the number of such operations. The layout of this aggregation field is given by the fact that an average quantity should be calculated ("Avg(x*y)"). The other aggregation field is designed to hold the lowest and highest values of the classification variable "Environment index" for each combination of values of the classification variables.

As in the first example, the intermediate data structure (Table 28) is built by evaluating the mathematical expression for the current content of the virtual data record (each row in Table 27), and by aggregating the result in the appropriate aggregation field based on the combination of current values of the classification variables ("Client", "Environment index"). The intermediate data structure also includes data records in which the value "<ALL>" has been assigned to one or both of the classification variables. The corresponding aggregation fields contain the aggregated result when the one or more classification variables (dimensions) are eliminated.

When the intermediate data structure has been built, a final data structure, e.g., a multidimensional cube, is created by evaluating the mathematical functions based on the evaluated results of the mathematical expressions contained in the intermediate data structure. Each data record of the final data structure, as shown in Table 29, accommodates a value of each selected classification variable ("Client", "Environment index") and an aggregation field for each mathematical function selected by the user.

The final data structure is built based on the results in the aggregation fields of the intermediate data structure for each unique combination of values of the classification variables. When function (a) is evaluated, by sequentially reading data records of Table 28, the program first checks if both values in the last column of Table 28 is equal to '1'. If so, the relevant result contained in the first aggregation field of Table 28 is multiplied by two and stored in Table 29. If not, the relevant result contained in the first aggregation field of Table 28 is directly stored in Table 29. When function (b) is evaluated, the aggregated result of the mathematical expression ("x*y") operating on the selected calculation variables ("Number". "Price") is divided by the number of such operations, both of which are stored in the first aggregation field of Table 28. The result is stored in the second aggregation field of Table 29.

It is readily apparent that the present disclosure permits the user to freely select mathematical functions and incorporate calculation variables in these functions as well as to freely select classification variables for presentation of the results.

As an alternative or in addition, albeit less memory-efficient, to the illustrated procedure of building an intermediate data structure based on sequential data records from the starting table, it is conceivable to first build a so-called join table. This join table is built by traversing all data records of the starting table and, by use of the conversion structure, converting each value of each connecting variable in the starting table into a value of at least one corresponding selected variable in a boundary table. Thus, the data records of the join table will contain all occurring combinations of values of the selected variables. Then, the intermediate data structure is built based on the content of the join table. For each record of the join table, each mathematical expression is evaluated and the result is aggregated in the appropriate aggregation field based on the current value of each selected classification variable. However, this alternative procedure requires more computer memory to extract the requested information.

It should be realized that the mathematical function could contain mathematical expressions having different, and conflicting, needs for frequency data. In this case, steps 104 110 (FIG. 2) are repeated for each such mathematical expression, and the results are stored in one common intermediate data structure. Alternatively, one final data structure, e.g., multi-dimensional cube, could be built for each mathematical expression, the contents of these cubes being fused during presentation to the user.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Figure 7:
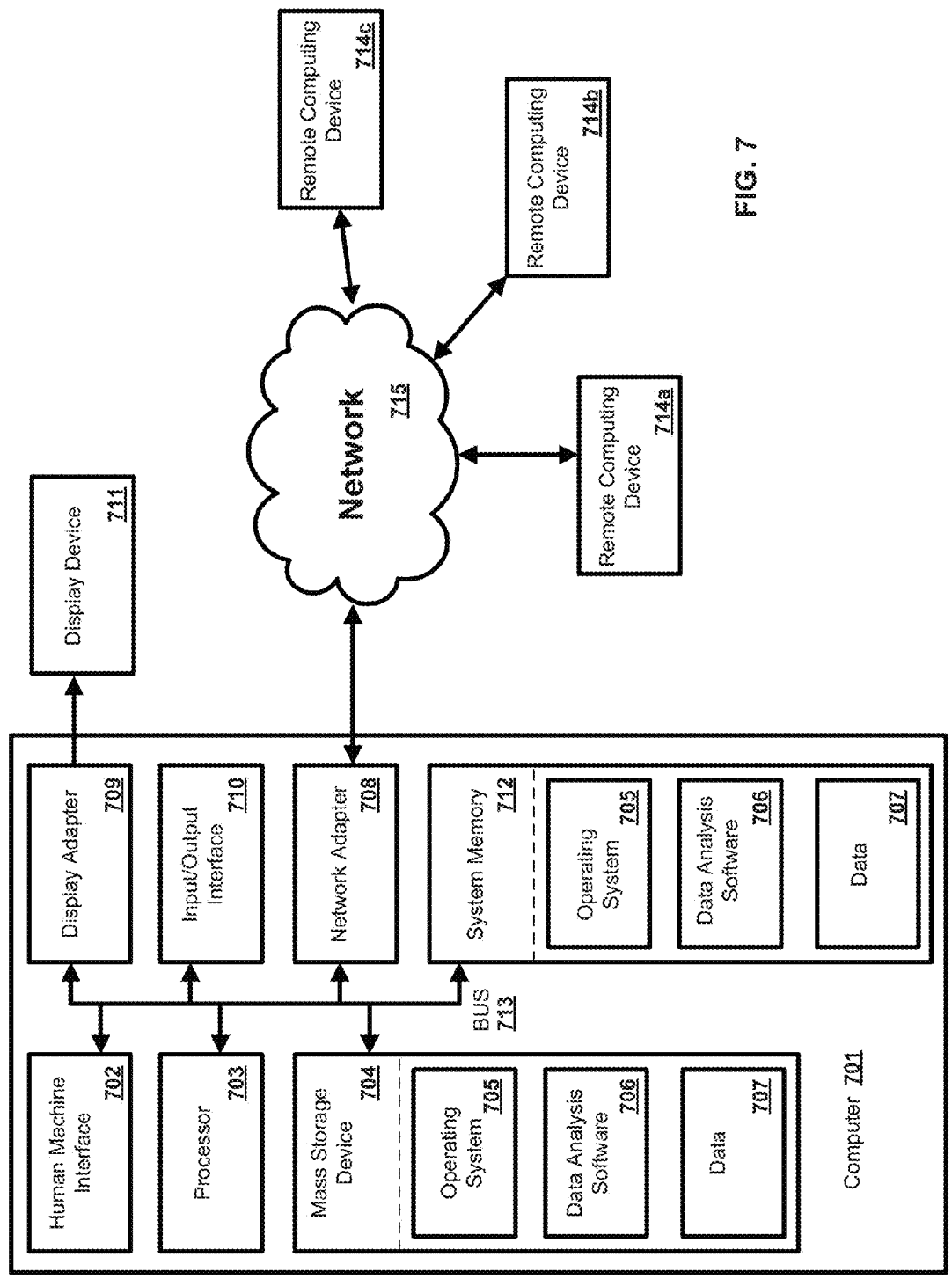
FIG. 7 is an exemplary operating environment.

One skilled in the art will appreciate that provided is a functional description and that respective functions can be performed by software, hardware, or a combination of software and hardware. In an aspect, the methods and systems can comprise the Data Analysis Software 706 as illustrated in FIG. 7 and described below. In one exemplary aspect, the methods and systems can comprise a computer 701 as illustrated in FIG. 7 and described below.

FIG. 7 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 701. The components of the computer 701 can comprise, but are not limited to, one or more processors or processing units 703, a system memory 712, and a system bus 713 that couples various system components including the processor 703 to the system memory 712. In the case of multiple processing units 703, the system can utilize parallel computing.

The system bus 713 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 713, and all buses specified in this description can also be implemented over a wired or wireless network connection and each of the subsystems, including the processor 703, a mass storage device 704, an operating system 705, Data Analysis software 706, data 707, a network adapter 708, system memory 712, an Input/Output Interface 710, a display adapter 709, a display device 711, and a human machine interface 702, can be contained within one or more remote computing devices 714a,b,c at physically separate locations, connected through buses of this form, in effect implementing a fully distributed system.

The computer 701 typically comprises a variety of computer readable media. Exemplary readable media can be any available media that is accessible by the computer 701 and comprises, for example and not meant to be limiting, both volatile and non-volatile media, removable and non-removable media. The system memory 712 comprises computer readable media in the form of volatile memory, such as random access memory (RAM), and/or non-volatile memory, such as read only memory (ROM). The system memory 712 typically contains data such as data 707 and/or program modules such as operating system 705 and Data Analysis software 706 that are immediately accessible to and/or are presently operated on by the processing unit 703.

In another aspect, the computer 701 can also comprise other removable/non-removable, volatile/non-volatile computer storage media. By way of example, FIG. 7 illustrates a mass storage device 704 which can provide non-volatile storage of computer code, computer readable instructions, data structures, program modules, and other data for the computer 701. For example and not meant to be limiting, a mass storage device 704 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 704, including by way of example, an operating system 705 and Data Analysis software 706. Each of the operating system 705 and Data Analysis software 706 (or some combination thereof) can comprise elements of the programming and the Data Analysis software 706. Data 707 can also be stored on the mass storage device 704. Data 707 can be stored in any of one or more databases known in the art. Examples of such databases comprise, DB2®, Microsoft™ Access, Microsoft® SQL Server, Oracle®, mySQL, PostgreSQL, and the like. The databases can be centralized or distributed across multiple systems.

In another aspect, the user can enter commands and information into the computer 701 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 703 via a human machine interface 702 that is coupled to the system bus 713, but can be connected by other interface and bus structures, such as a parallel port, game port, an IEEE 1394 Port (also known as a Firewire port), a serial port, or a universal serial bus (USB).

In yet another aspect, a display device 711 can also be connected to the system bus 713 via an interface, such as a display adapter 709. It is contemplated that the computer 701 can have more than one display adapter 709 and the computer 701 can have more than one display device 711. For example, a display device can be a monitor, an LCD (Liquid Crystal Display), or a projector. In addition to the display device 711, other output peripheral devices can comprise components such as speakers (not shown) and a printer (not shown) which can be connected to the computer 701 via Input/Output Interface 710. Any step and/or result of the methods can be output in any form to an output device. Such output can be any form of visual representation, including, but not limited to, textual, graphical, animation, audio, tactile, and the like.

The computer 701 can operate in a networked environment using logical connections to one or more remote computing devices 714a,b,c. By way of example, a remote computing device can be a personal computer, portable computer, a server, a router, a network computer, a peer device or other common network node, and so on. Logical connections between the computer 701 and a remote computing device 714a,b,c can be made via a local area network (LAN) and a general wide area network (WAN). Such network connections can be through a network adapter 708. A network adapter 708 can be implemented in both wired and wireless environments. Such networking environments are conventional and commonplace in offices, enterprise-wide computer networks, intranets, and the Internet 715.

For purposes of illustration, application programs and other executable program components such as the operating system 705 are illustrated herein as discrete blocks, although it is recognized that such programs and components reside at various times in different storage components of the computing device 701, and are executed by the data processor(s) of the computer. An implementation of Data Analysis software 706 (e.g., a compiled instance of such software) can embody or can comprise one or more of the methods of the disclosure, such as the example methods presented in FIGS. 19-20 and related description, and can be stored on or transmitted across some form of computer readable media. Any of the disclosed methods can be embodied in and can be performed by execution of computer-readable and/or computer-executable instructions embodied on computer readable media, such as system memory 712 or mass storage device 704. For example, in response to execution of the data analysis software 706, the processor 703 can implement at least a portion of one or more of the methods described herein (e.g., example method in FIGS. 19-20) and disclosed systems. Computer readable media can be any available media that can be accessed by a computer or a computing device. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

The methods and systems described above enable real-time associative data mining and visualization. In an aspect, the methods and systems can manage associations among data sets with every data point in the analytic dataset being associated with every other data point in the dataset. Datasets can be hundreds of tables with thousands of fields.

In an aspect, provided are methods and systems for user interaction with the database methods and systems disclosed. In an aspect, a user interface can be generated to facilitate dynamic display generation to view data. By way of example, a particular view of a particular dataset or data subset generated for a user can be referred to as a state space or a session. The system can comprise a visualization component to dynamically generate one or more visual representations of the data to present in the state space.

Figure 8:
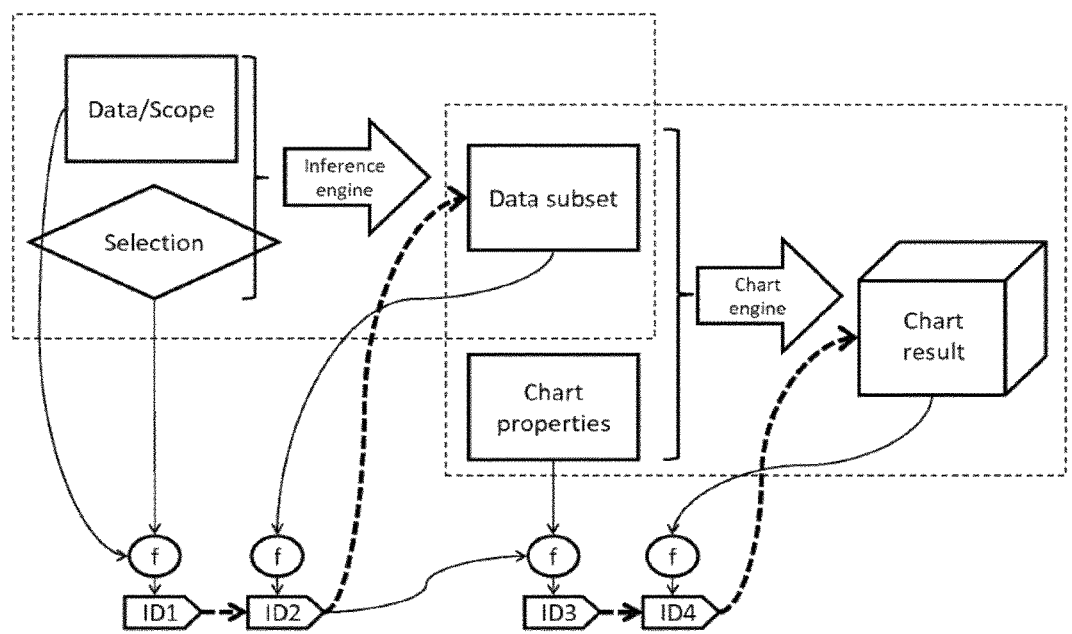
FIG. 8 illustrates how a Selection operates on a Scope to generate a Data Subset.

FIG. 8 illustrates how a Selection operates on a Scope to generate a Data Subset. The Data subset can form a state space, which is based on a selection state given by the Selection. In an aspect, the selection state (or "user state") can be defined by a user clicking on list boxes and graphs in a user interface of an application. An application can be designed to host a number of graphical objects (charts, tables, etc) that evaluate one or more mathematical functions (also referred to as an "expression") on the Data subset for one or more dimensions (classification variables). The result of this evaluation creates a Chart result which is a multidimensional cube which can be visualized in one or more of the graphical objects.

The application can permit a user to explore the Scope by making different selections, by clicking on graphical objects to select variables, which causes the Chart result to change. At every time instant during the exploration, there exists a current state space, which is associated with a current selection state that is operated on the Scope (which always remains the same).

As illustrated in FIG. 8, when a user makes a new selection, an inference engine calculates a data subset. Also, the identifier ID1 for the selection together with the scope can be generated based on the filters in the selection and the scope. Subsequently, the identifier ID2 for the data subset is generated based on the data subset definition, typically a bit sequence that defines the content of the data subset. Finally, ID2 can be put into a cache using ID1 as lookup identifier. Likewise, the data subset definition is put in the cache using ID2 as lookup identifier.

In FIG. 8, the chart calculation takes place in a similar way. Here, there are two information sets: the data subset and the relevant chart properties. The latter is typically, but not restricted to, a mathematical function together with calculation variables and classification variables (dimensions). Both of these information sets are used to calculate the chart result, and both of these information sets are also used to generate the identifier ID3 for the input to the chart calculation. ID2 was generated already in the previous step, and ID3 is generated as the first step in the chart calculation procedure.

The identifier ID3 is formed from ID2 and the relevant chart properties. ID3 can be seen as an identifier for a specific chart generation instance, which includes all information needed to calculate a specific chart result. In addition, a chart result identifier ID4 is created from the chart result definition, typically a bit sequence that defines the chart result. Finally, ID4 is put in the cache using ID3 as lookup identifier. Likewise, the chart result definition is put in the cache using ID4 as lookup identifier.

Figure 9:
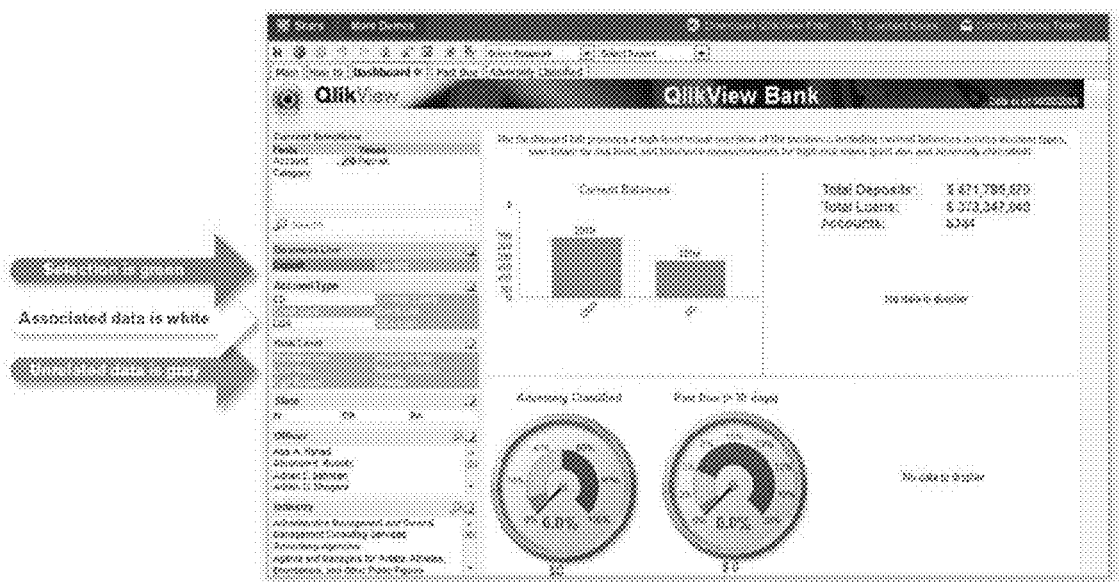
FIG. 9 illustrates an exemplary user interface.

The graphical objects (or visual representations) can be substantially any display or output type including graphs, charts, trees, multi-dimensional depictions, images (computer generated or digital captures), video/audio displays describing the data, hybrid presentations where output is segmented into multiple display areas having different data analysis in each area and so forth. A user can select one or more default visual representations, however, a subsequent visual representation can be generated based off of further analysis and subsequent dynamic selection of the most suitable form for the data. As shown in FIG. 9 several list boxes are provided on the left side of the interface and graphical objects reflecting selections (or lack of selection) in the list boxes are displayed on the right side of the user interface. Placement of list boxes and graphical objects is a matter of design choice. In an aspect, a user can select a data point and a visualization component can instantaneously filter and re-aggregate other fields and corresponding visual representations based on the user's selection. In an aspect, the filtering and re-aggregation can be completed without querying a database. In an aspect, a visual representation can be presented to a user with color schemes applied meaningfully. For example, a user selection can be highlighted in green, datasets related to the selection can be highlighted in white, and unrelated data can be highlighted in gray. A meaningful application of a color scheme provides an intuitive navigation interface in the state space.

Figure 10A:
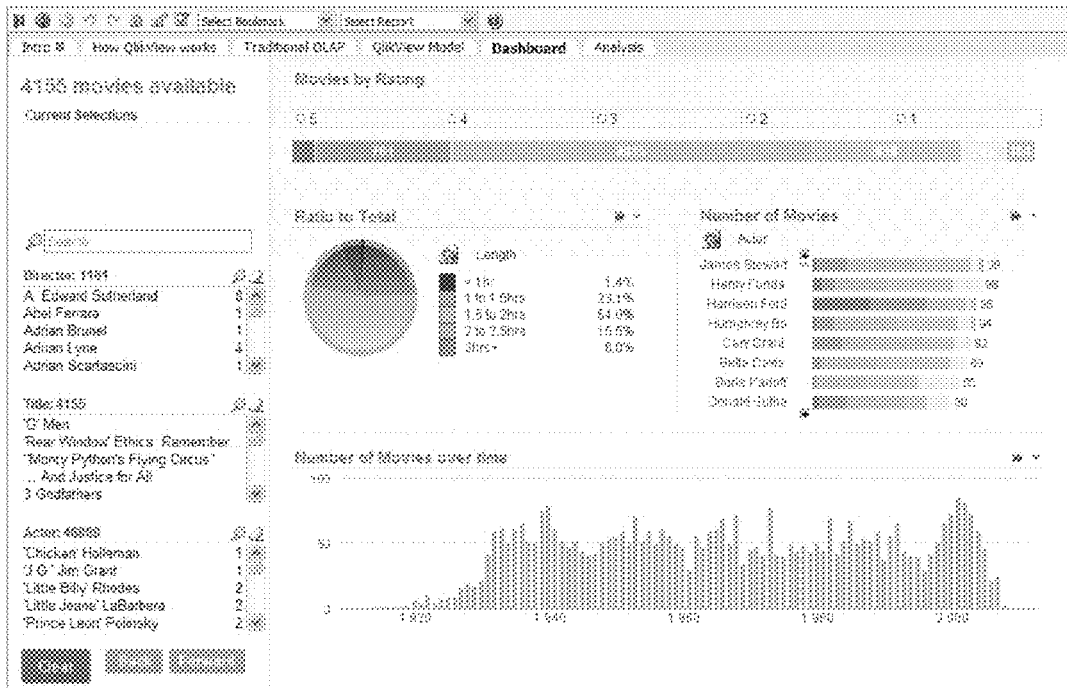
FIG. 10$a$ illustrates another exemplary user interface.
Figure 10B:

As shown in FIG. 10*a*, a layout including several graphical objects is provided to a user. The dataset reflects movie data. For example, movie directors, movie titles, movie actors, movie length, movie rating, movie release date, and the like. As shown in FIG. 10*b*, once the user selects a director, the graphical objects dynamically adjust in realtime. In this example, the user has selected the director "Emeric Pressburger." In response to the selection, all of the graphical objects adjust to reflect data having a relationship to "Emeric Pressburger."

Thus, the methods and systems provided enable a user to instantiate a session that enables the transformation of raw data into actionable analytics. While a single user can manipulate the interface to generate meaningful visual representations, also provided are methods and systems that facilitate collaborative sessions wherein multiple users can manipulate the interface at the same time or substantially the same time.

In an aspect, a user can share their session with one or more other users. As a result, the users can discover and develop new analyses in a real-time, collaborative environment. Each user can make selections that can be seen by all users. In some cases, restrictions can be implemented so that only some users can make selections. In a further example, transient lists (for example, searches, drop-downs, and the like) of a user can be hidden from other users.

In an aspect, two or more users can share a common session. The first time the session is generated is referred to as the primary session; while subsequent users who join are referred to as secondary sessions. In an aspect, only the primary session can invite others to join, while in another aspect, any user can invite others to join. The system can be configured such that all aspects of the secondary session mirror those of the primary session. If the primary session has section access reductions, these are mirrored in secondary sessions. Section access reductions can be a mechanism that provides data security. For example, when a user clicks on a list box, the user may be restricted to viewing a reduced amount of data versus another user with superior section access rights. For example, one user may be able to view all movie directors, whereas another user can only view one movie director. In an aspect, no checks on access rights or data security are applied to secondary sessions.

All users, primary and secondary, can share interactions with a user interface (for example, mouse clicks) that interact with the system. Any user who clicks, where that click changes a selection state, that change in state can be sent to one or more of the other clients. Any click that only affects the local client, and does not involve a message/response from the server is not shared. In the case that two or more clients click "at the same time" the server can treat each click as two or more asynchronous clicks, the same as if a single client had clicked once, and then clicked a second time canceling the first click.

In an aspect, the primary user can invite secondary users to join his/her session using a panel that drops down from the collaboration toolbar icon. Email invitations can permit the primary user to specify an email address, and some additional text that can be placed into the email body. When an "invite" button is pressed, an email can be sent to the recipient with a standard message, any additional message included by the primary user, and a URL to join the session.

An invitation to join a session can be performed using a specially formatted URL. This URL can provide a link back to the system, and the specific interface workspace. In addition, the URL can provide an additional parameter that is a one-time use key for identifying and joining the appropriate session. Once this URL has been clicked on (e.g., sent to the server) it can be invalidated, so it can only be used once, and cannot be forwarded.

The primary user can be notified when a secondary user joins the session. This notification can be a change in state (for example, changing color) of a collaboration toolbar icon and a message connected to that toolbar icon indicating who has joined the session. Once a secondary user has joined the session, one or more other users can view a list of users currently sharing the session, and in some aspects, remove users.

In another aspect, the primary user can invite secondary users to join his/her session using a panel that drops down from the collaboration toolbar icon. An additional option for inviting secondary users is by searching user directories that are accessible to the system. A primary user can use the directory search results to invite users directly.

In an aspect, illustrated in FIG. 11*a*, provided are methods for collaborative computing comprising, initiating a primary session for a first user at 1101, requesting collaboration from a second user at 1102, initiating a secondary session for the second user at 1103, and providing a single state space for collaborative realtime data analysis to the first user and the second user wherein an interaction by either user is reflected in the single state space at 1104.

In an aspect, illustrated in FIG. 11*b*, a collaboration session can comprise a single low-level shared session that can be connected to two or more higher level XML transformers. The XML transformers can be connected via synchronization logic. Each XML transformer can be attached to an end-point of a web session and the other end-point can be connected to a web browser. Commands and selections performed by any of the XML transformers can thus affect the shared low-level session and state changes can be propagated back to both XML transformers. The XML transformer that performed the command can return the state change to the client. The other XML transformer can return the changed state through the client asynchronous mechanism.

In a further aspect, provided are methods and systems for time shifted collaboration. Within a single state space, users can create and share notes about various objects contained within the state space. These notes can be shared with one or more other users, and these other users can respond by leaving their own note comments. Each user can save a "snapshot" (bookmark) of the state space and data with each note. The notes can be searchable by users to efficient access to the note and the associated snapshot of the state space.

Figure 12A:
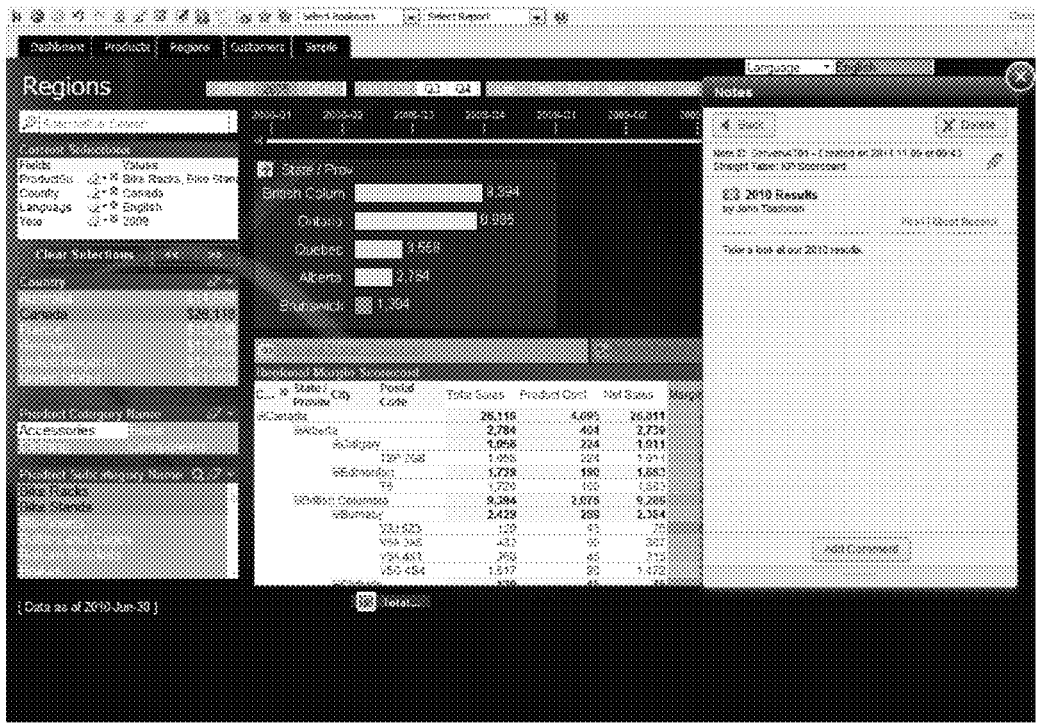
FIG. 12$a$ illustrates an exemplary user interface.
Figure 12B:

FIG. 12a illustrates a graphical object with an attached note and the note thread that can be viewed after selection of the note. FIG. 12b illustrates the change in the state space after selection of the saved selection state associated with the note.

By way of example, a user can right-click an object displayed in the state space, providing the user with a menu option to add a new note and to view existing notes, by selecting "Notes" from the context menu. Optionally, all objects in the state space with existing notes can be identified (for example, by an icon, a color change, and the like). Similarly, the number of attached notes for each object can be displayed. Thus, the resulting note can be linked to both an object and a selection state. An object can have one or more notes and one or more note threads (a series of comments based on a note). A user can create a note after the user has analyzed a dataset and accordingly arranged the state space. The user can select to attach a snapshot of the current state space to the note. The system can then create a hidden bookmark and attaches it to the note. In an aspect, multiple snapshots of a state space can be associated with a note, reflecting for example a comparison of two different analyses.

To view a note and the associated state space, a user can select a desired note and the note text will be presented to the user. The user can then add additional information to the note thread and chose to apply the bookmark, modifying the current state space to reflect the state space associated with the note. In another example, the state space can automatically update to reflect the state space associated with the note upon note selection.

Permissions can be adjusted for notes to control access to the notes by various classes of users. For example, a class of users might be able to view notes, but not make notes whereas another class of users can make notes, edit notes, and delete notes.

The methods for time shifted collaboration can be implemented in various fashions. For example, the notes (either a single note or a note thread) can be linked to a specific selection state and stored in one single "bookmark." Hence, one bookmark can comprise several notes for each object. By applying the bookmark, the notes become visible. In a further example, the notes can be linked to several selection states: Each note can correspond to one specific selection state, and all following replies in a note thread can pertain to the same selection state. The selection state belonging to a specific note can be stored in a temporary, hidden bookmark. In a still further example, the notes can be linked to the raw data or the data in input fields. Hence, the notes can be seen as textual input fields.

Figure 13A:
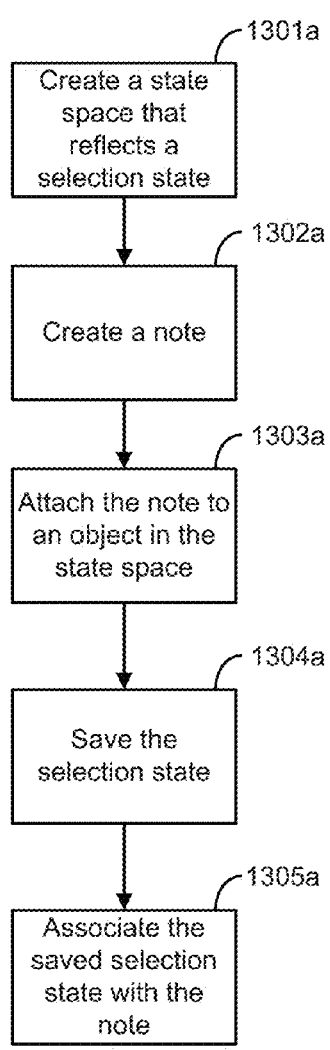
FIG. 13$a$ is a block flow chart of an exemplary method.

In an aspect, illustrated in FIG. 13a, provided are methods and systems for time shifted collaborative analysis comprising, creating a state space that reflects a selection state at 1301a, creating a note at 1302a, attaching the note to an object in the state space at 1303a, saving the selection state at 1304a, and associating the saved selection state with the note at 1305a.

Figure 13B:
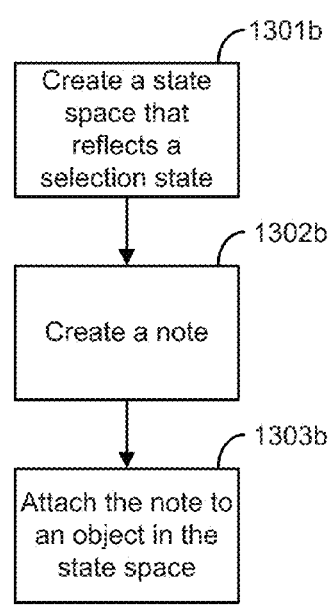

In a further aspect, illustrated in FIG. 13b, provided are methods and systems for time shifted collaborative analysis comprising, creating a state space that reflects a selection state at 1301b, creating a note at 1302b, and attaching the note to an object in the state space at 1303b.

Figure 13C:
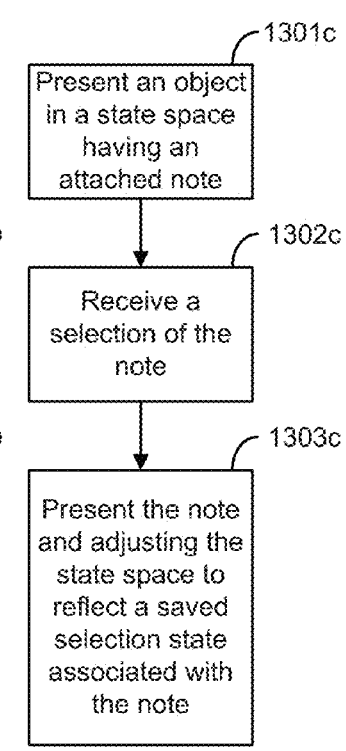

In a further aspect, illustrated in FIG. 13c, provided are methods and systems for time shifted collaborative analysis comprising, presenting an object in a state space having an attached note at 1301c, receiving a selection of the note at 1302c, and presenting the note and adjusting the state space to reflect a saved selection state associated with the note at 1303c.

In an aspect, the methods and systems provided allow a user to create multiple states within a single space and apply these states to specific objects within the space. The user can create copies of these objects and then put those objects into different states. Objects in a given state are not affected by user selections in the other states. The methods and systems provided permit a user to generate graphical objects that represent different state spaces (and thus different selection states) in one view.

Figure 14:
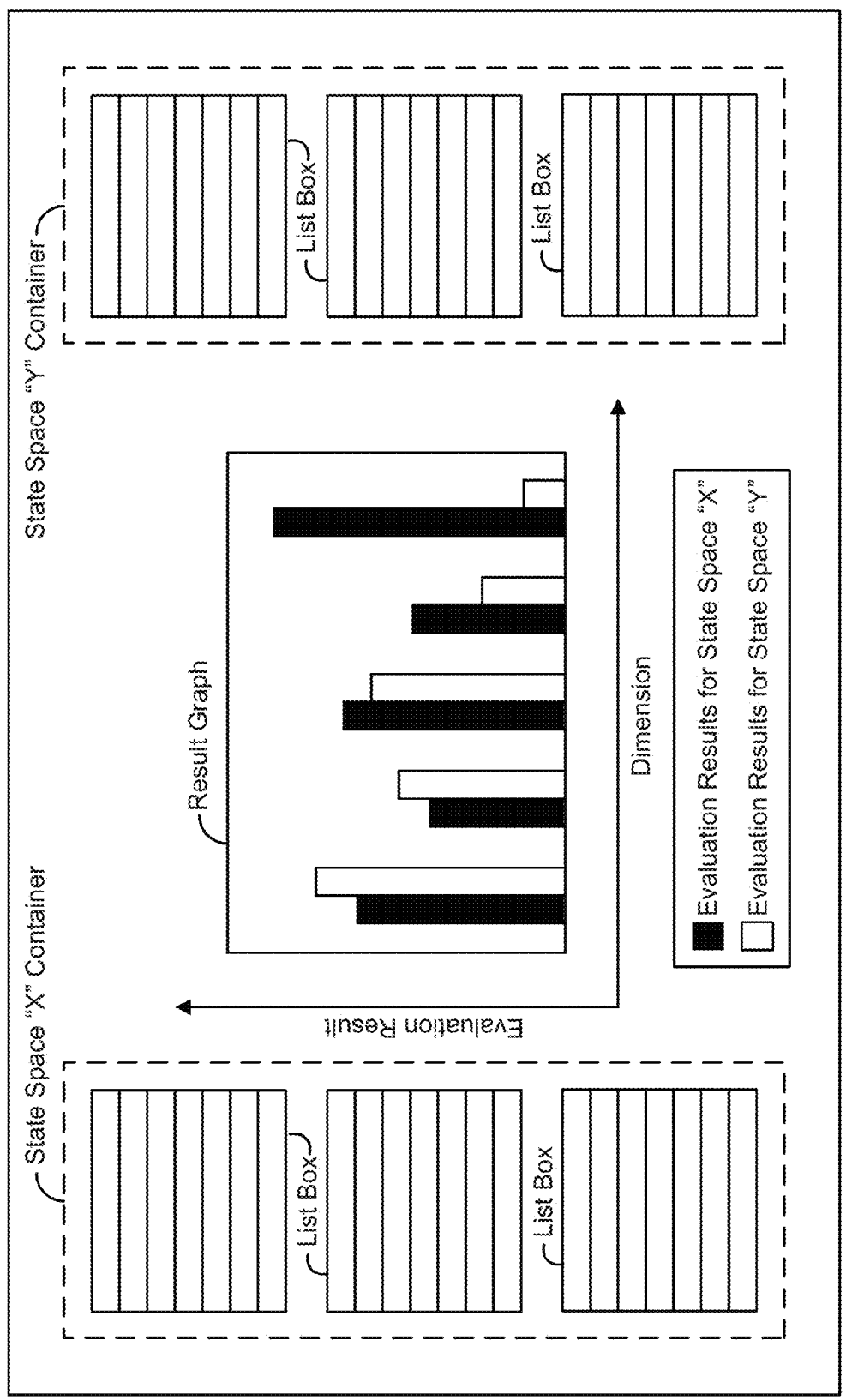
FIG. 14 illustrates an exemplary user interface.

The use of alternate states permits simultaneous use of multiple selections within the space and enable comparisons of the selections in a single visual representation or in separate visual representations. A user can select data items for comparative analysis, and then make an overriding selection that impacts the comparative analysis in real-time. FIG. 14 illustrates an exemplary implementation of alternate states.

The left-hand list boxes are logically associated with a state space X and are located in a state space X container, and the right-hand list boxes are logically associated with a state space Y and are located in a state space Y container. In this example, the result graph (chart) displays the results of evaluating a mathematical function (expression) in both the state space X and the state space Y. Thus, the user is able to define the state space X by clicking in the left-hand list boxes, causing the corresponding evaluation results to be displayed in the result graph. In the same way, the user is able to define the state space Y by clicking in the right-hand list boxes, causing the corresponding evaluation results to be displayed in the result graph.

Each state can be assigned a state identifier for system processing. In an aspect, at least two states can be made available, a default state and an inherited state. The default state can be the state where most usage occurs. Objects can inherit states from higher level objects, such as sheets and containers. This means that states are inherited as such: Document-Sheet-Sheet Objects. The sheets and sheet objects are always in the inherited state unless overridden. By way of example, a document can be an application document, a Sheet can be tab in such a document, and a container can be a region on a tab that may contain one or more Objects. An Object can be any textual or graphical object, e.g. a list box, a pie chart, a bar chart, etc. Sheets and sheet objects (e.g. containers and graphical objects) are always in the inherited state, but it is possible for a user to override the inherited state for a sheet or a sheet object by associating the sheet or the sheet object with an explicit state space.

In an aspect, a lower level can automatically inherit the state space of a higher level. As shown in FIG. 14, if the sheet (e.g., the view) is assigned to the default state space X, all containers and individual objects on this sheet with also be associated with this state space, unless otherwise specified. Thus, the user only needs to associate containers/objects with the state space Y as desired.

Chart and other object expressions inherit the state of the object that contains the expression. Chart and object expressions can reference alternate states. This means that an expression, no matter where it occurs, can reference a different state than the object that contains the expression.

The methods and systems can use the default state to drive a subset of data on which to calculate charts and aggregations by taking the definition of the state in terms of Values selected per Field and determining a Set in terms of a subset of Rows per Table. This default behavior can be changed at two distinct points to enable alternate states: 1. Defining a set of data that is independent of current selections; and 2. Combining multiple sets through the use of mathematical operators such as Union, Intersection and Exception.

Alternate States plays a role in the first part; defining selection states from which sets can be generated. For processing purposes, the default state can be represented by "$", while all the data, regardless of states and selections, can be represented by "1". Alternate states introduces two additional syntax elements.

1. An expression can be based on an alternate state.
Examples:
sum({[Group 1]}Sales)
calculates sales based on the selections in the state 'Group 1'.
sum({$}Sales)
calculates sales based on the selections in the default state. Both of these expressions can exist in a single chart. This allows users to compare multiple states within a single object. State references within expressions override the state of the object. FIG. 14 may be seen as such an implementation. State space X may be the default state space (represented by $), and state space Y may be the state space "Group 1". Thus, the left-hand bars in the result graph may be given by the mathematical function Sum({$}Sales), whereas the right-hand bars in the result graph may be given by the mathematical function Sum({[Group 1]}Sales). This is an example of the fact that an expression, no matter where it occurs, can reference a different state than the object that contains the expression.

Instead of displaying the evaluation results for state spaces X and Y in one and the same result graph, they may be displayed in separate graphs. In such an example, one of the graphs would be associated with the expression Sum({[Group 1]}Sales) and the other graph with the expression Sum({$}Sales).

2. Selections in a field in one state can be used as modifiers in another state.
Example:
sum({[Group 1]<Region=$::Region>}Sales)
This syntax uses the selections in the "Region" field from the default state and modifies the state 'Group 1' with them. The effect is to keep the Region field "synchronized" between the default state and 'Group 1' for this expression. Thus, selections in an object that is associated with a first state space (e.g. by the user clicking on a value in a list box associated with state space X) can be used to modify a second state space (e.g. state space Y) in addition to (or instead of) the first state space. In FIG. 14, this could be used to make sure that when the user makes a selection in a specific list box on the left-hand side, so as to modify the state space X, a corresponding modification (selection) is automatically made to the state space Y.

It is possible to use set operators (+, *, -, /) with states. The following expressions are valid and will count the distinct invoice numbers that are in either the default state or State1.
Examples:
count({$+State1}DISTINCT [Invoice Number])
counts the distinct invoice numbers in the union of the <default> state and State1.
count({1-State1}DISTINCT [Invoice Number])
counts the distinct invoice numbers not in State1.
count({State1*State2}DISTINCT [Invoice Number])
counts the distinct invoice numbers in that are in both the <default> state and State1.

Thus, the methods and systems provide a method of logically combining data in different state spaces by the use of logical operators known from Boolean algebra:
+=UNION (A+B contains all elements of both A and B)
*=INTERSECT (A*B contains all elements of A that also belong to B)
-=DIFF (A-B contains all elements of A that do not belong to B)
/=XOR (A/B contains all elements that are only found in one of A and B)

The use of Set Operators makes it possible to combine and evaluate data from two of more state spaces in one expression, e.g. for display in a graph.

Figure 15:
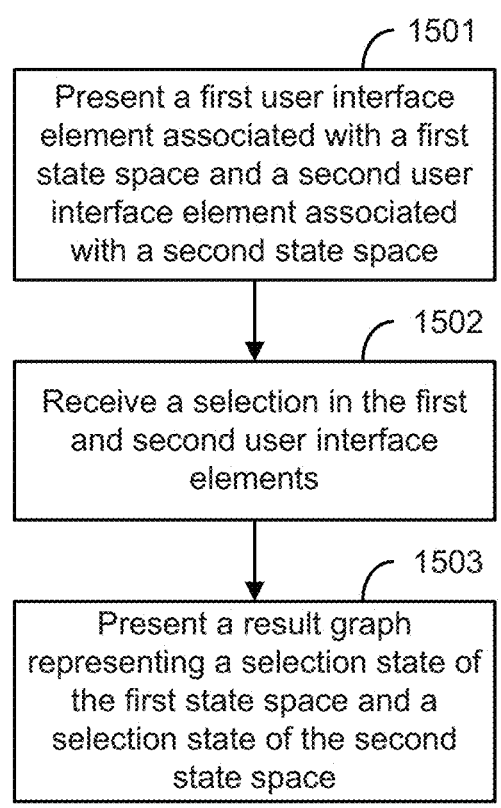
FIG. 15 is a block flow chart of an exemplary method.

In an aspect, illustrated in FIG. 15, provided are methods for data analysis comprising presenting a first user interface element associated with a first state space and a second user interface element associated with a second state space at 1501, receiving a selection in the first and second user interface elements at 1502, and presenting a result graph representing the a selection state of the first state space and a selection state of the second state space 1503. In an aspect, the first state space and the second state space can comprise the same dataset or different data sets.

Figure 16:
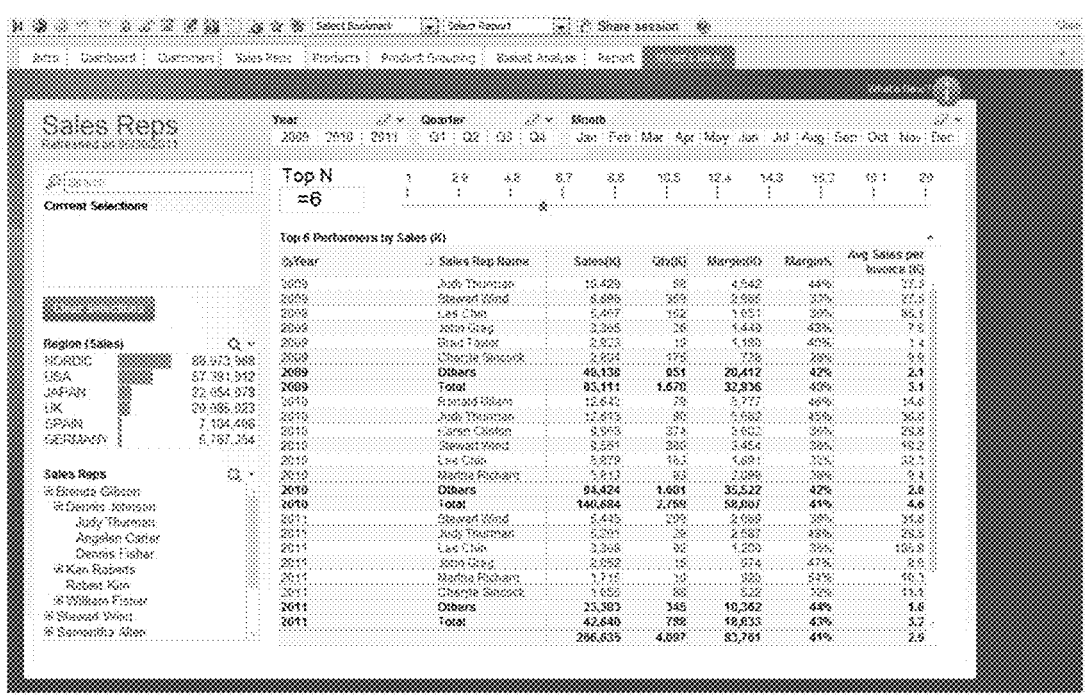
FIG. 16 illustrates an exemplary user interface.

In an aspect, provided are methods and systems for utilizing dimension limits. Dimension limits can be set for various chart types or, more generally, for most any graphical object described herein. A user can be presented with a Dimension Limits option to control the number of dimension values displayed in a given chart or graphical object. The user can select one of a plurality of values, for example: First N, Largest M, and Smallest, where N and M are natural numbers indicative of the cardinality of a set of values that are intended to be provided (or returned). It should be appreciated that, in one aspect, N and M can be provided as options to the dimension controls "First," and "Largest." These values or dimension controls can control the manner in which the system (e.g., the computer 701 encoded (or programmed or configured) with the data analysis software 706 in accordance with aspects described herein) can sort the values that the system can returns to the visualization component (e.g., display device 711 operating or configured to operate in response to execution, by the processor 703, of the data analysis software 706). In an aspect, sorting only occurs for the first expression (except in pivot tables when a primary sort may override the first dimension sort). In an aspect, shown in FIG. 16, one or more user interface elements can be presented to apply one or more dimension limits. For example, a sliding selection tool can be presented to enable a user to apply the dimension limit "show only." The example in FIG. 16 illustrates the application of the dimension limit show only the top 6 sales performers.

Dimension Limits may be applied for generating data to be displayed in a chart (graph, table etc). These Dimension Limits can comprise one or more of:

Show Only

This option can be selected if the user wants to display the First, Largest or Smallest x number of values. If this option is set to 5, there will be five values displayed. If the dimension has Show Others enabled, the Others segment will take up one of the five display slots.

The First option will return the rows based on the options selected on the Sort tab of the property dialog. If the chart is a Straight Table, the rows will be returned based on the primary sort at the time. In other words, a user can change the values display by double-clicking on any column header and making that column the primary sort.

The Largest option returns the rows in descending order based on the first expression in the chart. When used in a Straight Table, the dimension values shown will remain consistent while interactively sorting the expressions. The dimensions values will (may) change when the order of the expressions is changed.

The Smallest option returns the rows in ascending order based on the first expression in the chart. When used in a Straight Table, the dimension values shown will remain consistent while interactively sorting the expressions. The dimensions values will (may) change when the order of the expressions is changed.

Show Only Values that are

This option can be selected if the user wants to display all dimensions values that meet the specified condition for this option. Select to display values based on a percentage of the total, or on an exact amount. The relative to the total option enables a relative mode which is similar to the Relative option on the Expressions tab of the property dialog. The value may be entered as a calculated formula.

Show Only Values that Accumulate to:

When this option is selected, all rows up to the current row are accumulated, and the result is compared to the value set in the option. The relative to the total option enables a relative mode which is similar to the Relative option on the Expressions tab of the property dialog, and compares the accumulated values (based on first, largest or smallest values) to the overall total. The value may be entered as a calculated formula.

Also provided are different display options comprising one or more of:

Show Others

Enabling this option will produce an Others segment in the chart. All dimension values that do not meet the comparison criteria for the display restrictions will be grouped into the Others segment. If there are dimensions after the selected dimension, Collapse Inner Dimensions will control whether individual values for the subsequent/inner dimensions display on the chart.

Global Grouping Mode

The option only applies to inner dimensions. When this option is enabled the restrictions will be calculated on the selected dimension only. All previous dimensions will be ignored. If this is disabled, the restrictions are calculated based on all preceding dimensions.

The use of Dimension Limits together with the selected option "Show others" will now be described in relation to a simplified example, based on a data set shown in FIG. 17*a* containing variables Customer, Product and Sales, given for Customers A-F and Products X and Y:

Example 1

Assume that the user wants to visualize the sales for each Customer. This corresponds to evaluating the mathematical function Sum(Sales) for the dimension variable Customer. This results in the following multidimensional cube (which may be visualized as a graph or a table, as shown in FIG. 17*b*):

Example 2

Assume now that the user has applied the Dimension Limit "Show only the first 3 values" to the dimension Customer for generation of the cube, while also ticking the box "Show Others". This results in the cube shown in FIG. 17*c*. As shown, the sales are shown for Customers A and B, while the sales of the remaining Customers (C-F) are aggregated into an "Others" value.

Example 3

Assume instead that the user has applied the Dimension Limit "Show only the largest 3 values" to the dimension Customer for generation of the cube, while also ticking the box "Show Others". This results in the cube shown in FIG. 17*d*. As shown, the sales are shown for Customers A and C, while the sales of the remaining customers (B and D-F) are aggregated into an "Others" value.

Example 4

Assume instead that the user has applied the Dimension Limit "Show only the values that are larger or equal to 50" to the dimension Customer for generation of the cube, while also ticking the box "Show Others". This results in the cube shown in FIG. 17*e*. As shown, the sales are shown for Customers A, B and C, while the sales of the remaining customers (D-F) are aggregated into an "Others" value.

Example 5

Assume instead that the user has applied the Dimension Limit "Show only the largest values that accumulate to 80% of the overall total" to the dimension Customer for generation of the cube, while also ticking the box "Show Others". This results in the cube shown in FIG. 17*f*. As shown, the sales are shown for Customers A, B, C and F, while the sales of the remaining customers (D and E) are aggregated into an "Others" value.

All of the examples make use of the calculations described previously herein. It is to be understood that the above examples are simplified to facilitate the understanding of Dimension Limits. However, in a practical case, one or more complex mathematical functions may be evaluated for a large amount of data connected over a multitude of different tables.

The data may be processed in binary coded format, by using a conversion structure and based on a starting table, to sequentially evaluate a mathematical function for one or more dimensions (classification variables). This is exemplified with reference to Tables 15 and 16 in FIG. 4.

Here, Table 15 illustrates the use of a virtual data record which is sequentially updated for each record in the starting table, and Table 16 illustrates how an intermediate data structure is populated based on the sequentially updated content of the virtual data record. The intermediate data structure contains an aggregation field that is used for aggregating the evaluation result of a mathematical expression for each existing unique combination of values of the classification variables. In Table 16, the intermediate data structure aggregates the evaluated result for the following combinations of Client and Year: (0,0), (1,0), (2,0) (3,−2). The value −2 indicates a NULL value.

Table 16 also illustrates how dimensions are "eliminated" or "collapsed" in the intermediate data structure, which means that the mathematical expression is aggregated for all values of one or more classification variables. In this process, additional data records are added to the intermediate data structure to hold the aggregation of the evaluated result for the collapsed dimension(s). In Table 16, the intermediate data structure contains the following data records when Client is collapsed: (−1,0), (−1,−2), and the following data records when Year is collapsed: (0,−1) (1,−1), (2,−1), (3,−1), and one data record when both Client and Year are collapsed: (−1,−1). The value −1 for a variable thus indicates that the evaluated results of all values of the variable have been aggregated.

The data in the intermediate data structure is then used for building a multidimensional cube, as shown in FIG. 5, Table 17. A slightly more advanced example of an intermediate data structure and a resulting multidimensional cube is illustrated in FIG. 6, Tables 28 and 29, respectively. Here, more complex mathematical functions are evaluated in the multidimensional cube (Table 29), and the intermediate data structure (Table 28) contains aggregation fields that aggregate the evaluation result of certain mathematical expressions that are required for correct evaluation of the mathematical functions in the multidimensional cube shown in Tables 28 and 29.

Returning to the above Examples 1-5, it should be realized that certain Dimension Limits can be applied by generating a full multidimensional cube (cfr. the Full table in Example 1 above) and simply selecting data in this cube, e.g. the 2 first Customers and their sales data (Example 2) or the 2 Customers with the largest sales and their sales data (Example 3).

A difficulty occurs when the Others value is to be evaluated, since this value cannot be defined when the multidimensional cube is generated (since its content is only known once the multidimensional cube has been generated). The Others value corresponds to an aggregation of the evaluated result for specific values of one or more classification variables (certain Customers in the above examples). In the above examples, the mathematical function is a simple summation and the evaluated result of the mathematical function for the Others value may be obtained by simply adding the sums (in the cube) for the Customers to be included in the Others value. However, if the mathematical function is more complex, e.g. if it contains an average quantity (see Tables 28-29 above), the Others value cannot be obtained by combining data in the cube.

One solution is to initiate calculation of a new multidimensional cube, which includes an aggregation field for the specific values of the classification variable(s) that define the Others value. In the context of Example 2, the new cube would be calculated to include a new Customer designated as "Others" which includes the aggregated result for Customers C-F.

To minimize data processing, the methods and systems can make use of the intermediate data structure (e.g., the existing or previously populated intermediate data structure) to populate the multidimensional cube with the Others value. As explained in the previously, the aggregation fields of the intermediate data structure are defined to enable the dimensions to be collapsed (eliminated). In some respects, the evaluation of an Others value may be regarded as a partial elimination of a dimension in the intermediate data structure.

Thus, in Examples 2-4, the Dimension Limits identify the values of the Customer variable to be included in the cube, together with the corresponding sales. The Others value of the cube is populated by aggregating the sales for the remaining values of the variable Customer by traversing the intermediate data structure.

In Example 5, the Dimension Limit requires the total sales to be known. The total sales data is only known once the intermediate data structure has been generated (corresponding to an elimination of the dimension Customer). To populate the Others value, the intermediate data structure is traversed once more to identify the largest values (sales) in the aggregation fields for the different Customers until at least 80% of the total sales is reached, and to evaluate the content of the Others value by aggregating the sales of the remaining Customers.

There are certain situations when it may not be possible to correctly evaluate the Others value based on the intermediate data structure, e.g. if the evaluation requires special attention to frequency data (mentioned in U.S. Pat. No. 7,058,621). In one embodiment, the methods and systems comprise a component that detects a potential need for special attention to frequency data. If such a potential need is detected, the methods and systems can refuse to populate the Others value. In a variant, the methods and systems can instead initiate calculation of a new multidimensional cube that includes the Others value (e.g., using the processing intensive alternative which is generally avoided by evaluating the Others value based on the intermediate data structure). In one example, a potential need for special attention to frequency data may be flagged whenever the software detects, during the generation of the multidimensional cube, that more than one data record in the intermediate data structure is updated based on the content of one virtual data record.

Example of Global Grouping Mode

Assume the multidimensional cube shown in FIG. 18*a*. Here, the cube is generated to evaluate the sales for two dimensions (classification variables): Product and Customer. Assume now that the user has applied the Dimension Limit "Show only the largest 3 values" to the variable Customer, while also ticking the box "Show Others". This would result in the multidimensional cube shown in FIG. 18*b*.

As shown, the process identifies the two Customers that have the largest sales of Product X and the two Customers that have the largest sales of Product Y, and generates an Others value for Product X and an Others value for Product Y. The Others value for Product X accumulates the sales for Customers C-F, and the Others value for Product Y accumulates the sales for Customers B and D-F. The Others values are generated in the same way as described above (e.g., by traversing the intermediate data structure).

Assume instead that the user has applied the same Dimension Limit for the variable Customer, and ticked the box "Global Grouping Mode" (while also ticking the box "Show Others"). This would result in the multidimensional cube shown in FIG. 18*c*.

The Global Grouping Mode causes the process to identify the two Customers that have the largest sales of all products (e.g., Product X and Product Y combined). The cube is generated to include the sales data for Product X for these two Customers, and an Others value that accumulates the sales for the remaining Customers for Product X (e.g., Customers B and D-F), as well as the sales data for Product Y for these two Customers, and an Others value that accumulates the sales for the remaining Customers for Product Y (e.g., Customers B and D-F).

Thus, the Global Grouping Mode causes the Dimension Limits to be applied only to the selected dimension (Customer).

Figure 19:
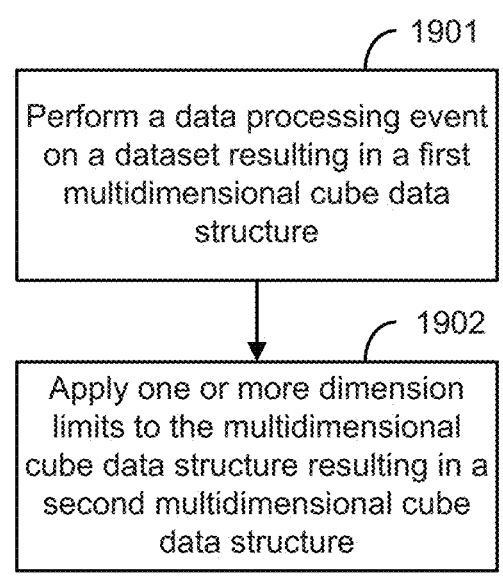
FIG. 19 is a block flow chart of an exemplary method.

In an aspect, illustrated in FIG. 19, and in view of the various features described herein in connection with dimension limits, provided are methods for data analysis comprising performing a data processing event on a dataset resulting in a first multidimensional cube data structure at 2301 and applying one or more dimension limits to the multidimensional cube data structure resulting in a second multidimensional cube data structure at 2302. The first data processing event can comprise evaluating a mathematical function for one or more dimension variables in the data set. The one or more dimension limits can comprise show only, show only values that are, show only values that accumulate, and the like. In an aspect, the second multidimensional cube data structure can by displayed according to one or more of show others, global grouping, and the like.

A user can be presented with a Dimension Limits option to control the number of dimension values displayed in a given chart. The user can select one of a plurality of values, for example: First, Largest, and Smallest. These values control the way the system sorts the values it returns to the visualization component. In an aspect, sorting only occurs for the first expression (except in pivot tables when a primary sort may override the first dimension sort).

Figure 20:
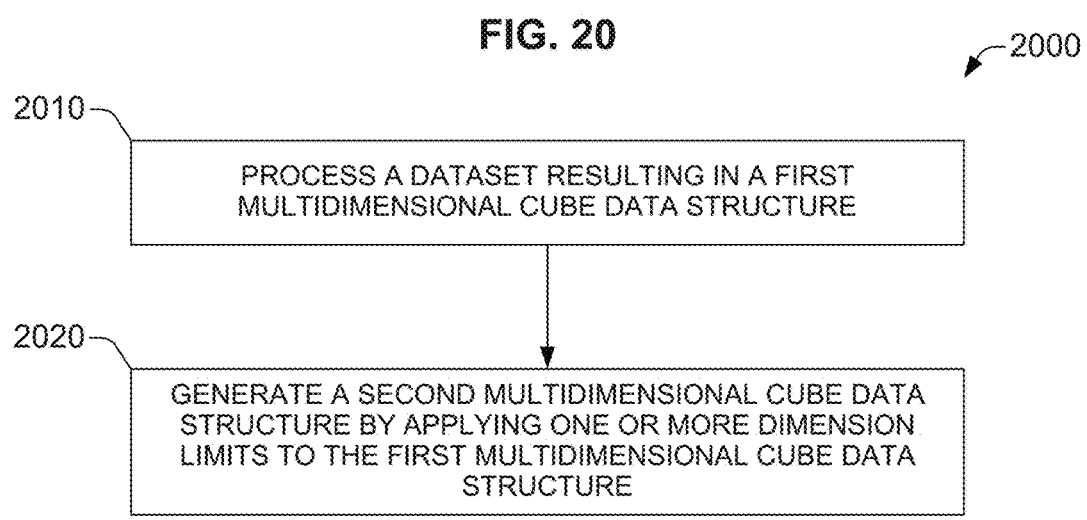
FIG. 20 illustrates an example method for data analysis in accordance with one or more aspects of the disclosure.

FIG. 20 illustrates a flowchart of an example method 2000 for data analysis in accordance with one or more aspects of the disclosure. A computing device, such as computer 701, or a processor integrated therein or functionally coupled thereto (such as the processor 703) can implement (e.g., execute) at least a portion of the example method 2000. At 2010, a dataset is processed resulting in a first multidimensional cube data structure, the dataset having a table structure comprising one or more tables. Implementation of 2010 (e.g., execution by a processor, such as processor 2120 or processor 703) can be referred to as the processing action. In one aspect, processing the dataset resulting in the first multidimensional cube data structure comprises evaluating a mathematical function for one or more dimension variables in the table structure.

At 2020, a second multidimensional cube data structure is generated by applying one or more dimension limits to the first multidimensional cube data structure. In one aspect, applying the one or more dimension limits to the first multidimensional cube data structure comprises configuring one or more user interface elements. In another aspect, applying the one or more dimension limits to the first multidimensional cube data structure comprises applying a dimension limit to a selected dimension variable of the second multidimensional cube data structure in response to selection of a specific display option. In yet another aspect, applying the one or more dimension limits to the first multidimensional cube data structure comprises applying a dimension limit resulting in a first specific portion of the second multidimensional cube data structure being displayed. In still another aspect, applying the one or more dimension limits to the first multidimensional cube data structure further comprises applying a display option resulting in a second specific portion of the second multidimensional cube data structure being displayed.

In one aspect, the first specific portion comprises a specific plurality of rows in a table contained in the first multidimensional cube data structure. In another aspect, wherein the first specific portion comprises a specific plurality of rows in a table contained in the first multidimensional cube data structure, respective values of the specific plurality of rows are accumulated and compared to a predetermined value. In yet another aspect, wherein the first specific portion comprises a first specific plurality of rows in a table contained in the first multidimensional cube data structure, the specific plurality of rows is ordered in descending order. In still another aspect, wherein the first specific portion comprises a first specific plurality of rows in a table contained in the first multidimensional cube data structure, the specific plurality of rows is ordered in ascending order. In an additional or alternative aspect, the first specific portion comprises one or more values that satisfy a specified condition.

In certain embodiments, the first specific portion comprises an aggregated value resulting from aggregating a plurality of values that dissatisfy a specific condition. In one aspect of such embodiments, the first multidimensional cube data structure contains the result of evaluating a specific mathematical function for one or more calculation variables in the dataset, and wherein the first multidimensional cube data structure is partitioned for every unique value of one or more dimension variables in the dataset.

In an additional or alternative aspect of such embodiments, processing the dataset resulting in the first multidimensional cube data structure comprises sequentially reading a data item from the one or more tables in the table structure, and populating an intermediate data structure comprising one or more data records, and wherein each one of the one or more data records contains a field for each dimension variable and an aggregation field for one or more mathematical expressions implied by the specific mathematical function. In one aspect, populating intermediate data structure comprising one or more data records comprises identifying, for the data item, a current value for each dimension variable, evaluating each one of the one or more mathematical expressions based on the data item, and aggregating the result of said evaluation in an appropriate aggregation field based on the current value of each dimension variable. In another aspect, the first multidimensional cube data structure is generated by evaluating the specific mathematical function based on the content of the aggregation field for every unique value of each dimension variable. In yet another aspect, the second multidimensional cube data structure is generated by traversing the intermediate data structure, thereby generating the aggregated value resulting from aggregating the plurality of values that dissatisfy the specific condition.

In one implementation, the example method 2000 can comprise identifying values of the one or more dimension variables that dissatisfy the specific condition based on the first multidimensional cube data structure. In one aspect, traversing the intermediate data structure can comprise aggregating the content of the aggregation fields associated with the values of the one or more dimension variables that dissatisfy the specific condition, thereby evaluating the specific mathematical function for aggregating the plurality of values that dissatisfy the specific condition.

Figure 21:
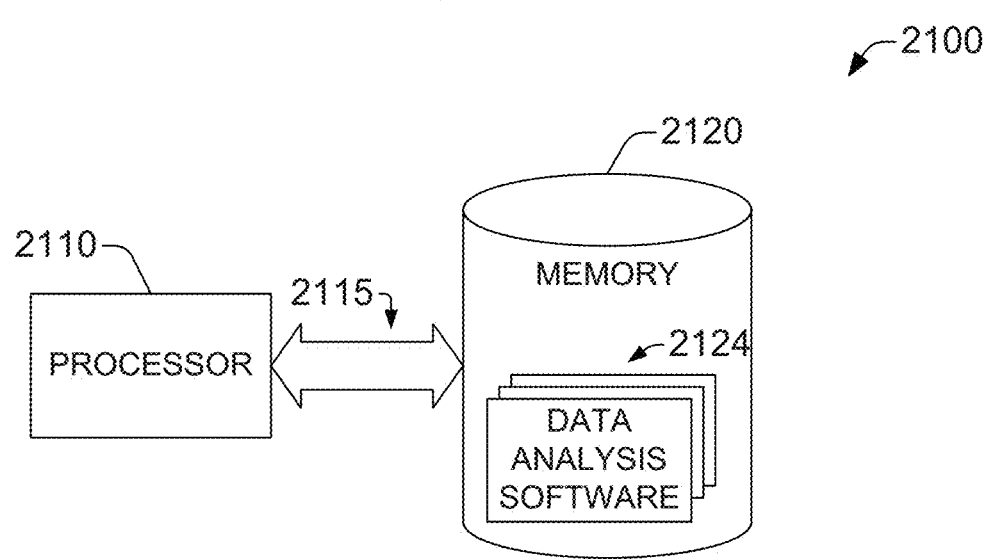
FIG. 21 illustrates an example computing device for data analysis in accordance with one or more aspects of the disclosure.

FIG. 21 illustrates an example computing device 2100 that can implement (e.g., execute) at least a portion of one or more of the methods of the disclosure. As illustrated, the computing device 2100 comprises a processor 2110 functionally coupled to a memory 2120 via a bus 2115. The processor 703 can embody or can comprise the processor 2110, the system memory 712 can comprise or can embody the memory 2120, and the bus 713 can comprise or can embody the bus 2115. In one embodiment, the computer-executable instructions contained in data analysis software 2124 can configure the processor 2110 to process a dataset resulting in a first multidimensional cube data structure the dataset having a table structure comprising one or more tables. In addition, in one aspect, such instructions can configure the processor 2110 to apply one or more dimension limits to the first multidimensional cube data structure resulting in a second multidimensional cube data structure. In one aspect, each of the one or more dimension limits restricts a displayed number of values of one or more dimension variables in the second multidimensional cube data structure.

In another aspect, the processor 2110 can be further configured to apply a dimension limit to a selected dimension variable of the second multidimensional cube data structure in response to selection of a specific display option. In yet another aspect, the processor 2110 can be further configured to apply a dimension limit resulting in a first specific portion of the second multidimensional cube data structure being displayed. The first specific portion can comprise a specific plurality of rows in a table contained in the first multidimensional cube data structure. In addition or in the alternative, the first specific portion can comprise a specific plurality of rows in a table contained in the first multidimensional cube data structure, respective values of the specific plurality of rows are accumulated and compared to a predetermined value. Moreover or as another alternative, the first specific portion comprises a first specific plurality of rows in a table contained in the first multidimensional cube data structure, the specific plurality of rows is ordered in descending order. In certain scenarios, the first specific portion comprises a first specific plurality of rows in a table contained in the first multidimensional cube data structure, the specific plurality of rows is ordered in ascending order. In other scenarios, the first specific portion can comprise one or more values that satisfy a specified condition.

In one aspect, the processor 2110 can be further configured to configure one or more user interface elements. In another aspect, the processor can be configured to apply a display option resulting in a second specific portion of the second multidimensional cube data structure being displayed. In yet another aspect, the processor can be further configured to evaluate a mathematical function for one or more dimension variables in the dataset.

While the methods and systems of the disclosure have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method for data analysis, comprising:
processing a dataset resulting in a first multidimensional cube data structure, the dataset having a table structure comprising one or more tables;
receiving, from a user, one or more dimension limits associated with a graphical representation of the data, wherein the one or more dimension limits control a number of values displayed to the user for corresponding dimensions of the first multidimensional cube data structure;
generating a second multidimensional cube data structure by applying the one or more dimension limits to the first multidimensional cube data structure; and
transmitting the second multidimensional cube data structure for display to the user.

2. The method of claim 1, wherein applying the one or more dimension limits to the first multidimensional cube data structure comprises configuring one or more user interface elements.

3. The method of claim 1, wherein applying the one or more dimension limits to the first multidimensional cube data structure comprises applying a dimension limit to a selected dimension variable of the second multidimensional cube data structure in response to selection of a specific display option.

4. The method of claim 1, wherein applying the one or more dimension limits to the first multidimensional cube data structure comprises applying a dimension limit resulting in a first specific portion of the second multidimensional cube data structure being displayed.

5. The method of claim 4, wherein applying the one or more dimension limits to the first multidimensional cube data structure further comprises applying a display option resulting in a second specific portion of the second multidimensional cube data structure being displayed.

6. The method of claim 4, wherein the first specific portion comprises a specific plurality of rows in a table of the first multidimensional cube data structure.

7. The method of claim 4, wherein the first specific portion comprises a specific plurality of rows in a table of the first multidimensional cube data structure, respective values of the specific plurality of rows are accumulated and compared to a predetermined value.

8. The method of claim 4, wherein the first specific portion comprises a first specific plurality of rows in a table of the first multidimensional cube data structure, the specific plurality of rows is ordered in descending order.

9. The method of claim 4, wherein the first specific portion comprises a first specific plurality of rows in a table of the first multidimensional cube data structure, the specific plurality of rows is ordered in ascending order.

10. The method of claim 4, wherein the first specific portion comprises one or more values that satisfy a specified condition.

11. The method of claim 1, wherein processing the dataset resulting in the first multidimensional cube data structure comprises evaluating a mathematical function for one or more dimension variables in the table structure.

12. The method of claim 4, wherein the first specific portion comprises an aggregated value resulting from aggregating a plurality of values that dissatisfy a specific condition.

13. The method of claim 12, wherein the first multidimensional cube data structure comprises the result of evaluating a specific mathematical function for one or more calculation variables in the dataset, and wherein the first multidimensional cube data structure is partitioned for every unique value of one or more dimension variables in the dataset.

14. The method of claim 13, wherein processing the dataset resulting in the first multidimensional cube data structure comprises sequentially reading a data item from the one or more tables in the table structure, and populating an intermediate data structure comprising one or more data records, and wherein each one of the one or more data records comprises a field for each dimension variable and an aggregation field for one or more mathematical expressions implied by the specific mathematical function.

15. The method of claim 14, wherein the populating action comprises identifying, for the data item, a current value for each dimension variable, evaluating each one of the one or more mathematical expressions based on the data item, and aggregating the result of said evaluation in an appropriate aggregation field based on the current value of each dimension variable.

16. The method of claim 15, wherein the first multidimensional cube data structure is generated by evaluating the specific mathematical function based on the content of the aggregation field for every unique value of each dimension variable.

17. The method of claim 16, wherein the second multidimensional cube data structure is generated by traversing the intermediate data structure, thereby generating the aggregated value resulting from aggregating the plurality of values that dissatisfy the specific condition.

18. The method of claim 17, further comprising identifying values of the one or more dimension variables that dissatisfy the specific condition based on the first multidimensional cube data structure.

19. The method of claim 18, wherein traversing the intermediate data structure comprises aggregating the content of the aggregation fields associated with the values of the one or more dimension variables that dissatisfy the specific condition, thereby evaluating the specific mathematical function for aggregating the plurality of values that dissatisfy the specific condition.

20. A device, comprising:
  a memory having computer-executable instructions; and
  a processor functionally coupled to the memory and configured, by the computer-executable instructions,
    to process a dataset resulting in a first multidimensional cube data structure, the dataset having a table structure comprising one or more tables;
    to receive, from a user, one or more dimension limits associated with a graphical representation of the data, wherein the one or more dimension limits control a number of values displayed to the user for corresponding dimensions of the first multidimensional cube data structure;
    to apply one or more dimension limits to the first multidimensional cube data structure resulting in a second multidimensional cube data structure; and
    to transmit the second multidimensional cube data structure for display to the user.

* * * * *